(12) United States Patent
Ohwa et al.

(10) Patent No.: US 7,844,115 B2
(45) Date of Patent: Nov. 30, 2010

(54) INFORMATION PROCESSING APPARATUS, METHOD, AND PROGRAM PRODUCT

(75) Inventors: Tsunayuki Ohwa, Tokyo (JP); Misa Tamura, Tokyo (JP); Satoshi Akagawa, Tokyo (JP)

(73) Assignee: Sony Corporation, Tokyo (JP)

( * ) Notice: Subject to any disclaimer, the term of this patent is extended or adjusted under 35 U.S.C. 154(b) by 906 days.

(21) Appl. No.: 11/691,702

(22) Filed: Mar. 27, 2007

(65) Prior Publication Data

US 2007/0282871 A1 Dec. 6, 2007

(30) Foreign Application Priority Data

Mar. 27, 2006 (JP) ............................. 2006-086130

(51) Int. Cl.
G06K 9/46 (2006.01)
G06K 9/48 (2006.01)
G06K 9/54 (2006.01)
G06K 7/10 (2006.01)

(52) U.S. Cl. ...................... 382/190; 382/198; 382/306; 382/321

(58) Field of Classification Search ................. 382/190, 382/198, 306, 321
See application file for complete search history.

(56) References Cited

U.S. PATENT DOCUMENTS

2004/0131255 A1* 7/2004 Ben-Yaacov et al. ........ 382/190
2005/0004903 A1* 1/2005 Tsuda ............................ 707/3
2006/0095836 A1* 5/2006 Ono et al. .................... 715/513
2007/0255734 A1* 11/2007 Morimoto .................... 707/100
2008/0279481 A1* 11/2008 Ando ........................... 382/306
2009/0154815 A1* 6/2009 Fujiwara ...................... 382/229
2009/0231441 A1* 9/2009 Walker et al. ............. 348/207.1

FOREIGN PATENT DOCUMENTS

| JP | 10-143631 | 5/1998 |
| JP | 2000-032250 | 1/2000 |
| JP | 2004-039138 | 2/2004 |

* cited by examiner

Primary Examiner—Bhavesh M Mehta
Assistant Examiner—Utpal Shah
(74) Attorney, Agent, or Firm—Oblon, Spivak, McClelland, Maier & Neustadt, L.L.P.

(57) ABSTRACT

An information processing apparatus includes feature extraction means for extracting features of a designated image in plural images which are associated with each other, image determination means for determining whether the designated image is an image of the face of a certificate, a receipt, a ticket or a note on which a character string is written based on the extracted features, and metadata addition means for adding the first metadata which is character string data of the character string to another image in the plural images, when it is determined that the designated image is an image of the face of a certificate, a receipt, a ticket or a note on which a character string is written.

18 Claims, 17 Drawing Sheets

FIG. 4
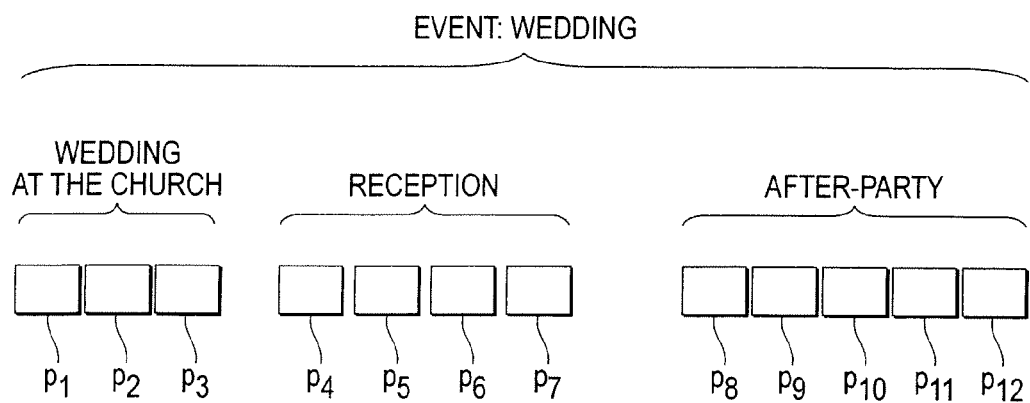
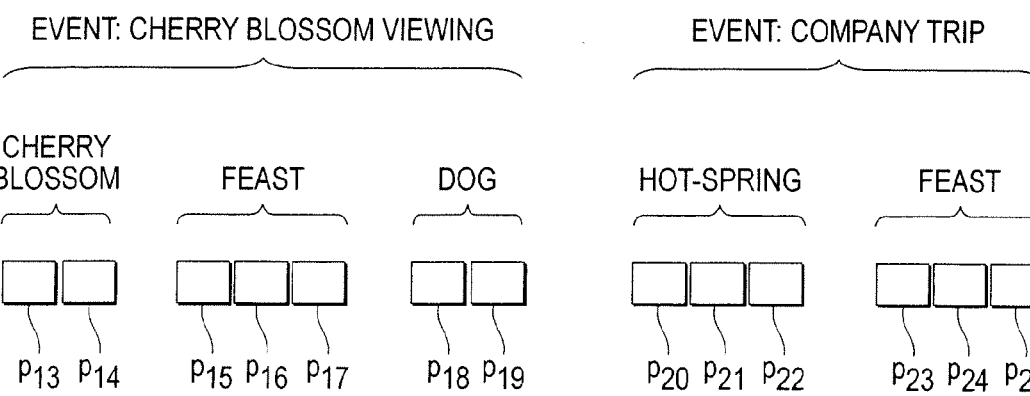

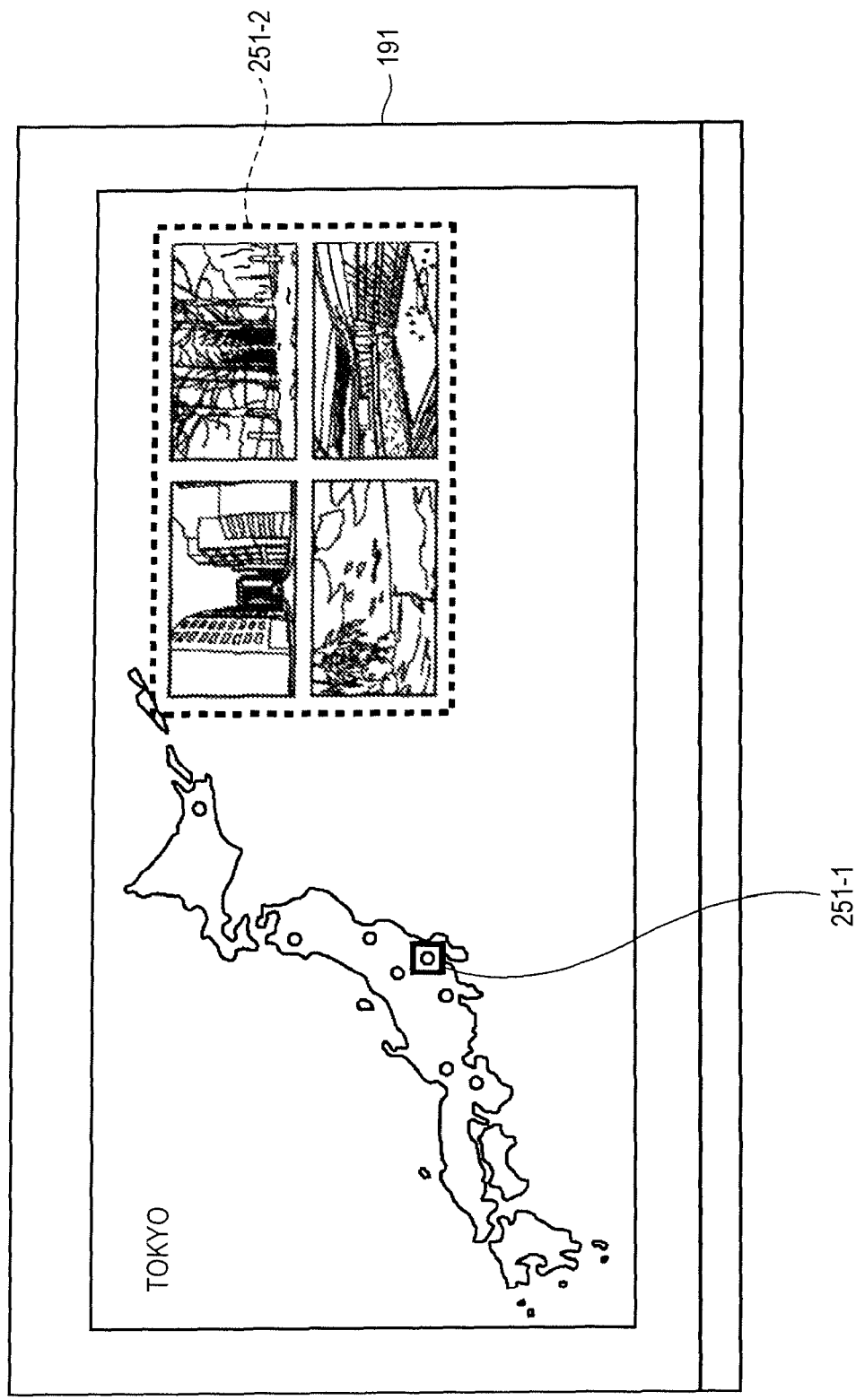

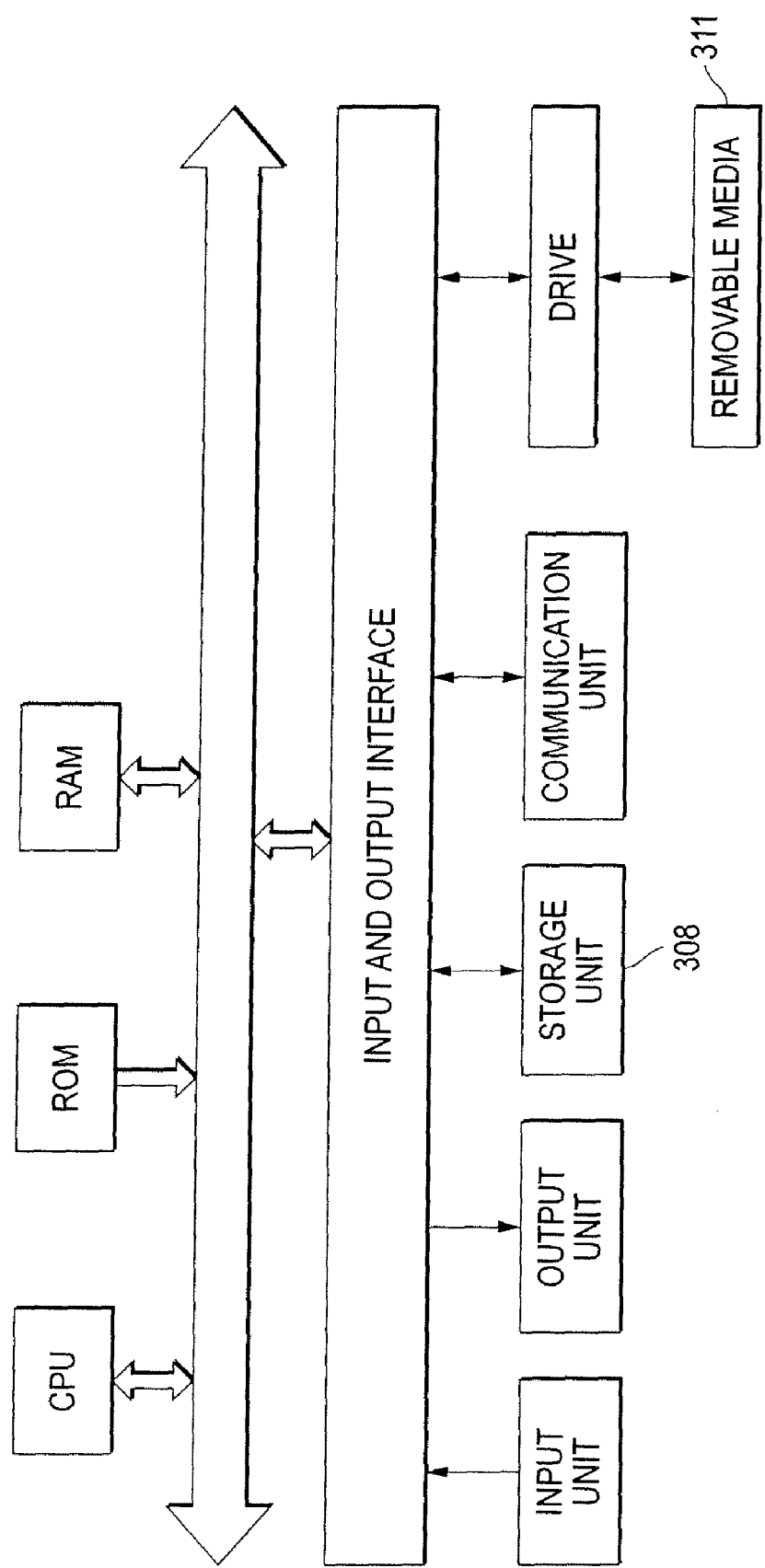

INFORMATION PROCESSING APPARATUS, METHOD, AND PROGRAM PRODUCT

CROSS REFERENCE TO RELATED APPLICATIONS

The present invention claims priority under 35 U.S.C. §119 to Japanese Patent Application JP 2006-086130 filed in the Japanese Patent Office on Mar. 27, 2006, the entire contents of which are incorporated herein by reference.

BACKGROUND OF THE INVENTION

1. Field of the Invention

The invention relates to an information processing apparatus, a method, and a program product. In particular, the present invention relates to an information processing apparatus, a method, and a program product which are capable of grouping contents based on metadata to create new contents.

2. Description of the Related Art

In related arts, equipment such as a HDD (Hard Disk Drive) recorder or a personal computer can search contents by using metadata added to the contents. However, in this case, it is necessary for a user to prompt the equipment actively concerning which metadata the user would like to use for the search. In addition, the user finally has to select one of the contents in a list on which searched results are displayed.

When photographs taken by a conventional film camera are kept in a photo album, for example, they can be kept in different albums or different pages according to events, places where they were taken or dates when they were taken. Further, it is possible to keep receipts, pamphlets, tickets and the like which are relevant to the taken photographs together. According to this, when searching photographs after years have passed, the photographs can be found according to the classified albums or pages based on a date or an event name as a key.

Additionally, there is an example in which photographed film images are converted into electronic images, kept and managed as electronic data by adding additional information such as photographed dates and places, and that the photograph films in which images are recorded are kept by associating them with the electronic data (for example, refer to JP-A-10-143631 (Patent document 1)).

SUMMARY OF THE INVENTION

However, in the HDD recorder or the personal computer of the related art, it is difficult that contents such as photographs and moving pictures are stored by associating with receipts, pamphlets or tickets in the manner such as the album of photographs taken by the conventional film camera.

The invention has been made in view of the above problem, as it is desirable to group contents based on metadata generated from, for example, receipts, pamphlets, tickets and the like.

An information processing apparatus according to an embodiment of the invention includes feature extraction means for extracting features of a designated image in plural images which are associated with each other, image determination means for determining whether the designated image is an image of the face of a certificate, a receipt, a ticket or a note on which a character string is written based on the extracted features, and metadata addition means for adding the first metadata which is character string data of the character string to another image in the plural images, when it is determined that the designated image is an image of the face of a certificate, a receipt, a ticket or a note on which a character string is written.

The feature extraction means is capable of extracting a feature which is a character string appearing in the designated image.

The feature extraction means is capable of extracting features of the designated image and recognizing a character string appearing in the designated image.

The information processing apparatus further includes metadata extraction means for extracting the second metadata added to the plural images associated with each other, and grouping means for grouping the plural images into groups based on the extracted second metadata.

The information processing apparatus further includes metadata extraction means for extracting the second metadata added to the plural images associated with each other, and creation means for creating a content in which the plural images divided into groups based on the extracted second metadata are arranged according to groups.

The creation means is capable of setting background images to be backgrounds of the plural images and arrangements of the plural images in the content according to the first metadata or the second metadata when the content is displayed.

The information processing apparatus further includes number-of-common metadata determination means for determining whether the number of images to which the same metadata in the first metadata and the second metadata is added is more than a prescribed threshold, and the creation means is capable of creating a content in which the plural images divided into groups based on the first metadata or the second metadata are arranged according to groups, when it is determined that the number of images to which the same metadata in the first metadata and the second metadata is added is more than the prescribed threshold.

The information processing apparatus further includes synonym acquisition means for acquiring synonyms of the first metadata or the second metadata for every image to which the first metadata or the second metadata as words is added and number-of-common metadata determination means for determining whether the number of images to which the same metadata in the first metadata and the second metadata is added is not less than a prescribed threshold, and the creation means is capable of creating a content in which the plural images divided into groups based on the first metadata, the second metadata or the synonyms of respective images are arranged according to groups, when it is determined that the number of images to which the same metadata in the first metadata and the second metadata is added is not less than the prescribed threshold.

The information processing apparatus further includes a display control unit for controlling display of the contents.

An information processing method according to an embodiment of the invention includes the steps of extracting features of a designated image in plural images associated with each other, determining whether the prescribed image is an image of the face of a certificate, a receipt, a ticket or a note on which a character string is written based on the extracted features, and adding the first metadata which is character string data of the character string to another image in the plural images, when it is determined that the designated image is an image of the face of a certificate, a receipt, a ticket or a note on which a character string is written.

A program product according to an embodiment of the invention includes the steps of extracting features of a designated image in plural images associated with each other, determining whether the prescribed image is an image of the face of a certificate, a receipt, a ticket or a note on which a character string is written based on the extracted features, and adding the first metadata which is character string data of the character string to another image in the plural images, when it is determined that the designated image is an image of the face of a certificate, a receipt, a ticket or a note on which a character string is written.

According to an embodiment of the invention, features of a designated image in plural images associated with each other are extracted, the designated image is judged whether it is an image of the face of a certificate, a receipt, a ticket or a note on which a character string is written based on the extracted features, and the first metadata which is character string data of the character string is added to another image in the plural images, when it is determined that the designated image of the face of a certificate, a receipt, a ticket or a note on which a character string is written.

As described above, according to an embodiment of the invention, contents can be created. Also according to an embodiment of the invention, contents can be grouped based on metadata generated by, for example, receipts, pamphlets, tickets and the like.

BRIEF DESCRIPTION OF THE DRAWINGS

FIG. 4 is a view showing an example in which clustering is further performed with respect to the clusters of images;

FIG. 17 is view showing further another example of display of a table of scrap books; and FIG. 18 is a diagram showing a configuration example of a personal computer.

DESCRIPTION OF THE PREFERRED EMBODIMENTS

Embodiments of the invention will be described below, and the correspondence between constituent features of the invention and embodiments described in the specification and the drawings is exemplified as follows. The description is made for confirming that embodiments which support the invention are written in the specification and the drawings. Therefore, if there is an embodiment that is written in the specification and the drawings but not written here as the embodiment corresponding to a constituent feature of the invention, that does not mean that the embodiment does not correspond to the constituent feature. Conversely, if an embodiment is written here as the embodiment corresponding to a constituent feature, that does not mean that the embodiment does not correspond to other than the constituent feature.

An information processing apparatus according to an embodiment of the invention includes feature extraction means (for example, a feature extraction unit 54 in FIG. 2) for extracting features of a designated image in plural images which are associated with each other, image determination means (an image determination unit 55 in FIG. 2) for determining whether the designated image is an image of the face of a certificate, a receipt, a ticket or a note on which a character string is written based on the extracted features, and metadata addition means (for example, a metadata addition unit 56 in FIG. 2) for adding the first metadata which is character string data of the character string to another image in the plural images, when it is determined that the designated image is an image of the face of a certificate, a receipt, a ticket or a note on which a character string is written.

Figure 5:
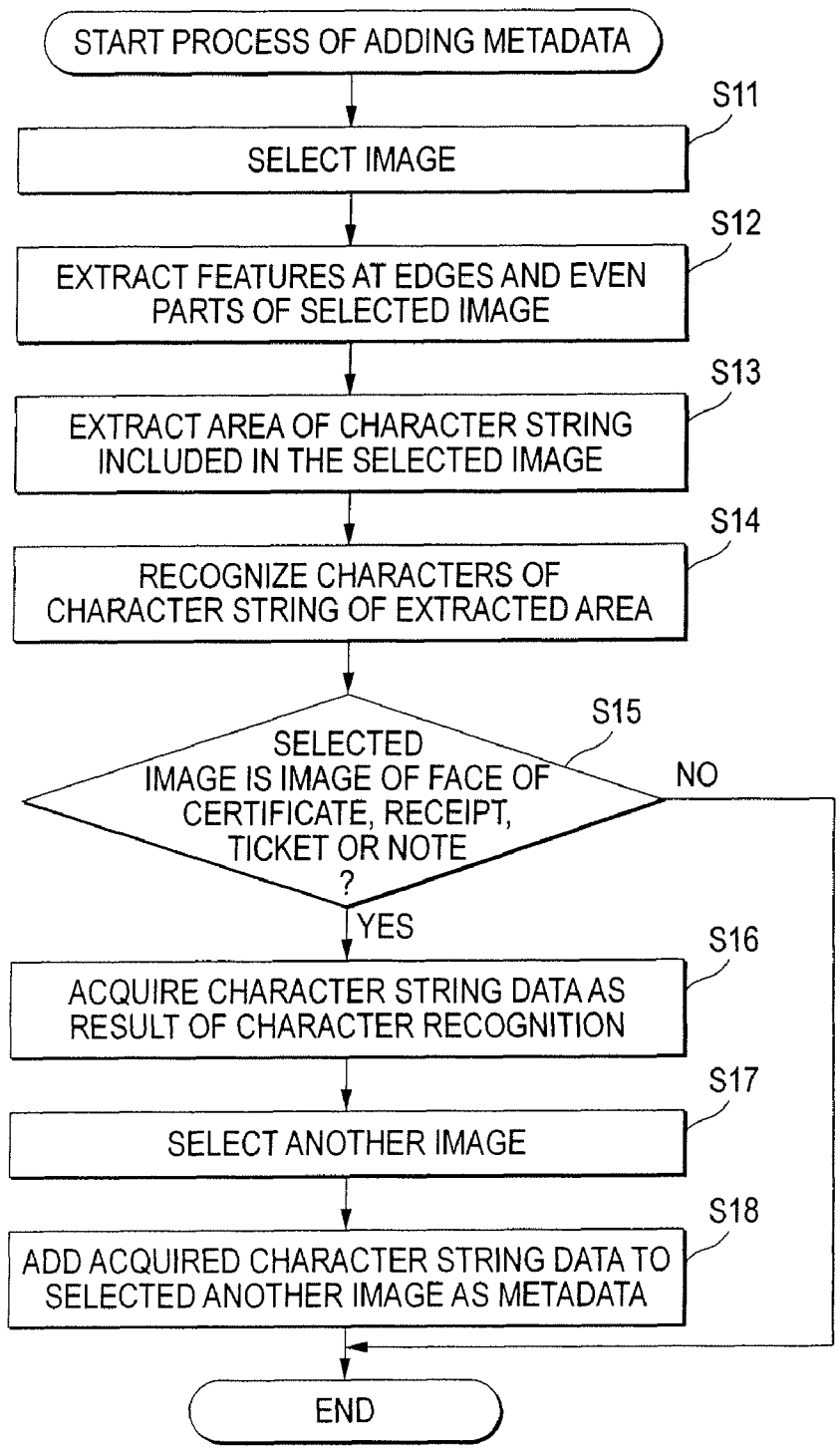
FIG. 5 is a flowchart explaining an example of the process of adding metadata.

The feature extraction means is capable of extracting a feature which is a character string appearing in the designated image (for example, step S13 in FIG. 5).

The feature extraction means is capable of extracting features of the designated image and recognizing a character string appearing in the designated image (for example, step S14 in FIG. 5).

The information processing apparatus further includes metadata extraction means (a metadata extraction unit 57 in FIG. 2) for extracting the second metadata added to the plural images associated with each other, and grouping means (a computing unit 72 in FIG. 2) for grouping the plural images into groups based on the extracted second metadata.

The information processing apparatus further includes creation means (content creation means 58 in FIG. 2) for creating a content in which the plural images divided into groups based on the extracted second metadata are arranged according to groups.

Figure 6:
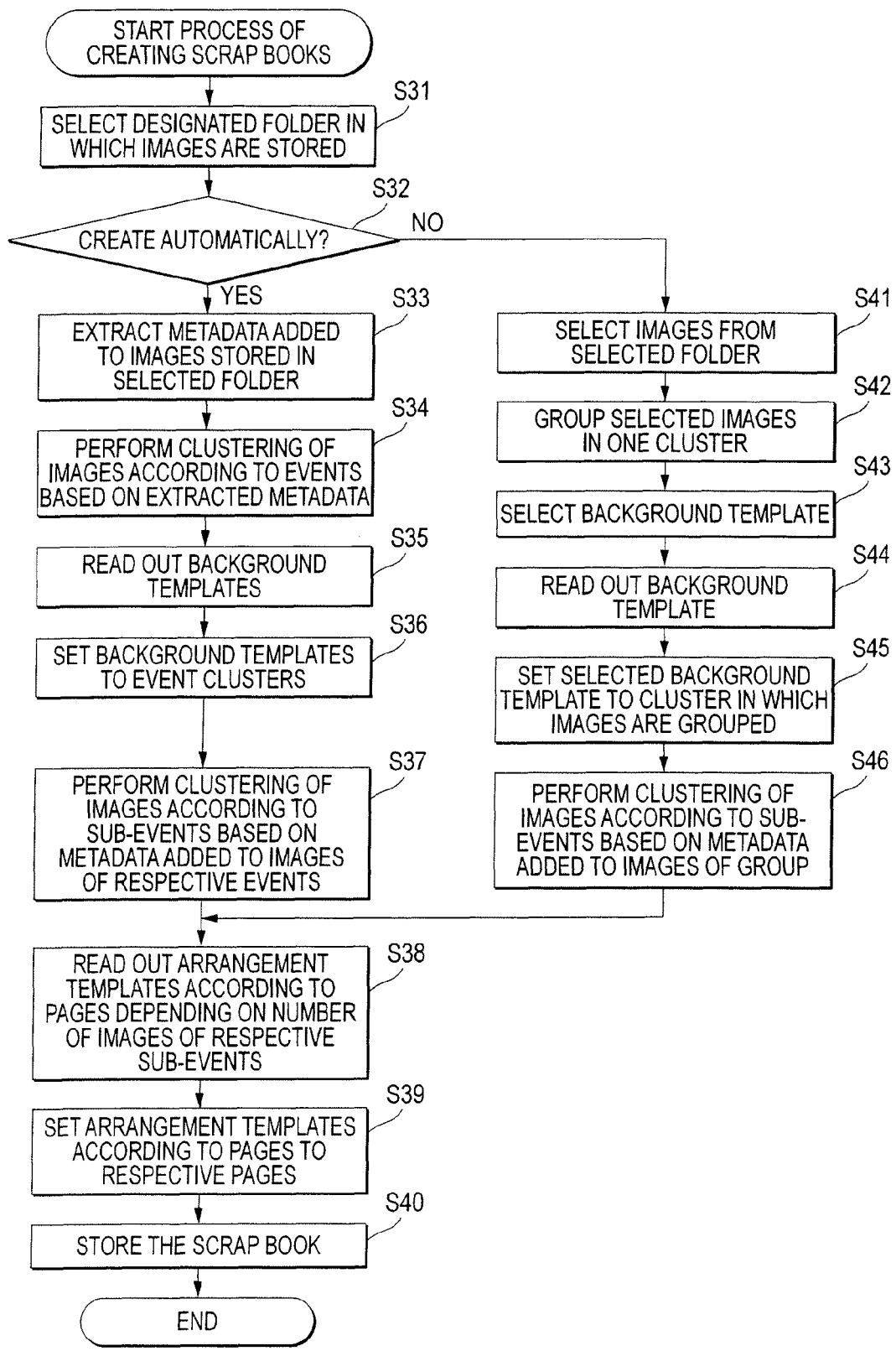
FIG. 6 is a flowchart explaining an example of creating scrap books.

The creation means is capable of setting background images to be backgrounds of the plural images and arrangements of the plural images in the content according to the first metadata or the second metadata when the content is displayed (for example, step S36 and step S39 in FIG. 6).

Figure 2:
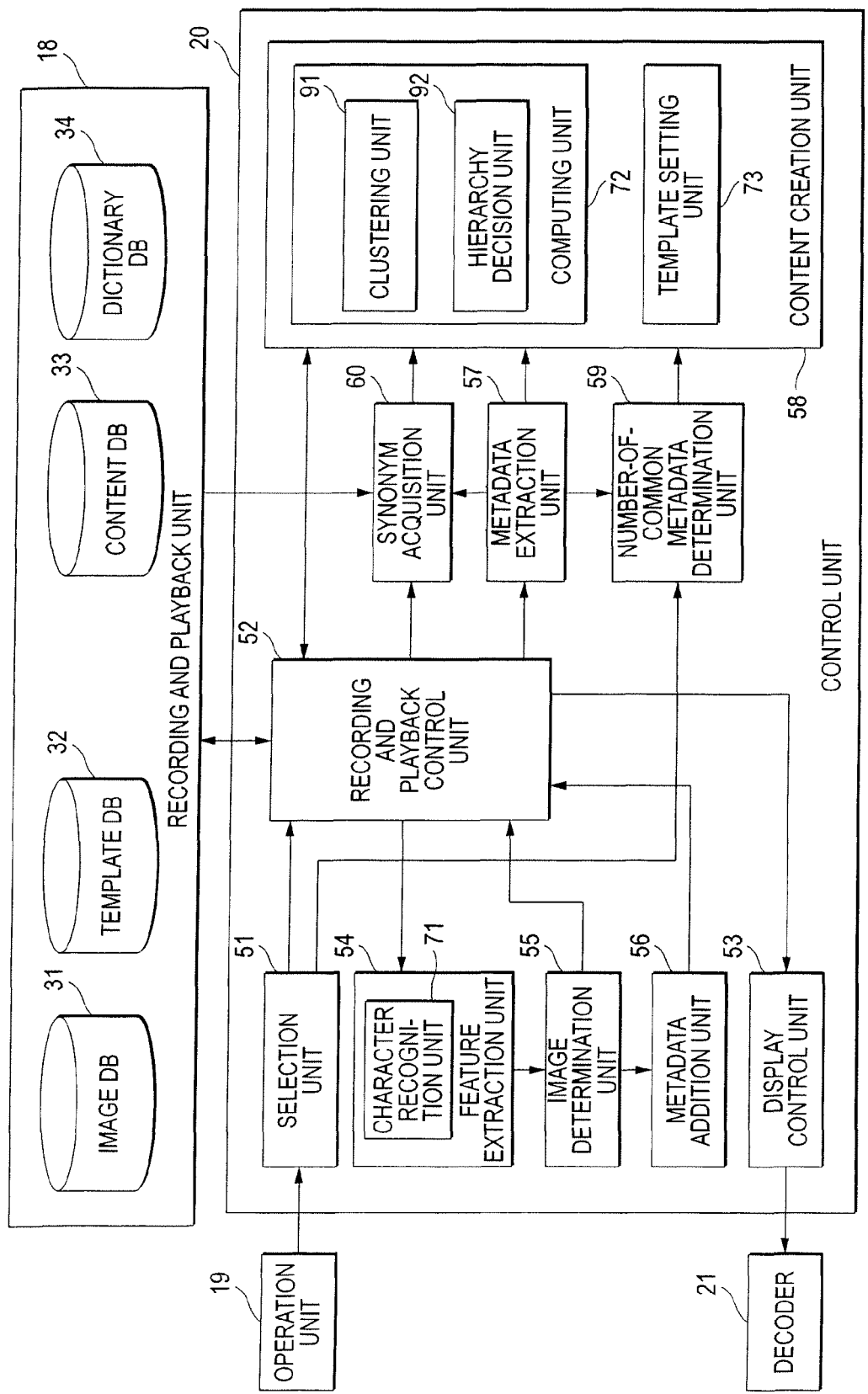
FIG. 2 is a block diagram showing an exemplary configuration of a control unit of the HDD recorder.
Figure 11:
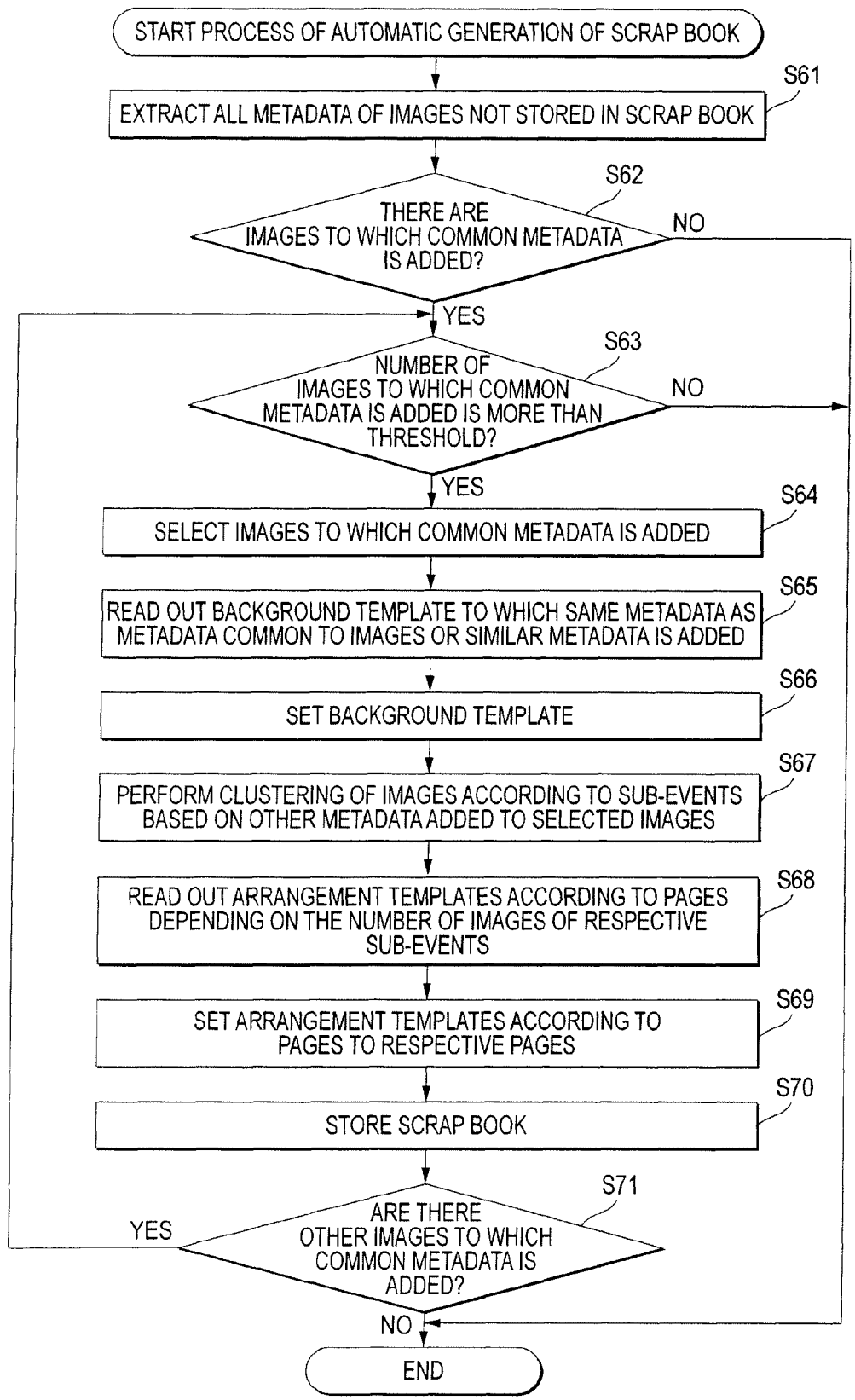
FIG. 11 is a flowchart explaining an example of the process of automatic generation of the scrap book.

The information processing apparatus further includes number-of-common metadata determination means (for example, a number-of-common metadata determination unit 59 in FIG. 2) for determining whether the number of images to which the same metadata in the first metadata and the second metadata is added is not less than a prescribed threshold, and the creation means is capable of creating a content in which the plural images divided into groups based on the first metadata or the second metadata are arranged according to groups, when it is determined that the number of images to which the same metadata in the first metadata and the second metadata is added is not less than the prescribed threshold (for example, step S64 to step S70 in FIG. 11).

The information processing apparatus further includes synonym acquisition means (for example, synonym acquisition means 60 in FIG. 2) for acquiring synonyms of the first metadata or the second metadata for every image to which the first metadata or the second metadata as words is added.

The information processing apparatus further includes a display control unit (for example, a display control unit 53 in FIG. 2) for controlling display of the contents.

A information processing method according to an embodiment of the invention includes the steps of extracting features of a designated image in plural images associated with each other (for example, step S12 and step S13 in FIG. 5), determining whether the prescribed image is an image of the face of a certificate, a receipt, a ticket or a note on which a character string is written based on the extracted features (for example, step S15 in FIG. 5), and adding the first metadata which is character string data of the character string to another image in the plural images, when it is determined that the designated image is an image of the face of a certificate, a receipt, a ticket or a note on which a character string is written (for example, step S18 in FIG. 5).

A program product according to an embodiment of the invention includes the steps of extracting features of a designated image in plural images associated with each other (for example, step S12 and step S13 in FIG. 5), determining whether the prescribed image is an image of the face of a certificate, a receipt, a ticket or a note on which a character string is written based on the extracted features (for example, step S15 in FIG. 5), and adding the first metadata which is character string data of the character string to another image in the plural images, when it is determined that the designated image is an image of the face of a certificate, a receipt, a ticket or a note on which a character string is written (for example, step S18 in FIG. 5).

Figure 1:
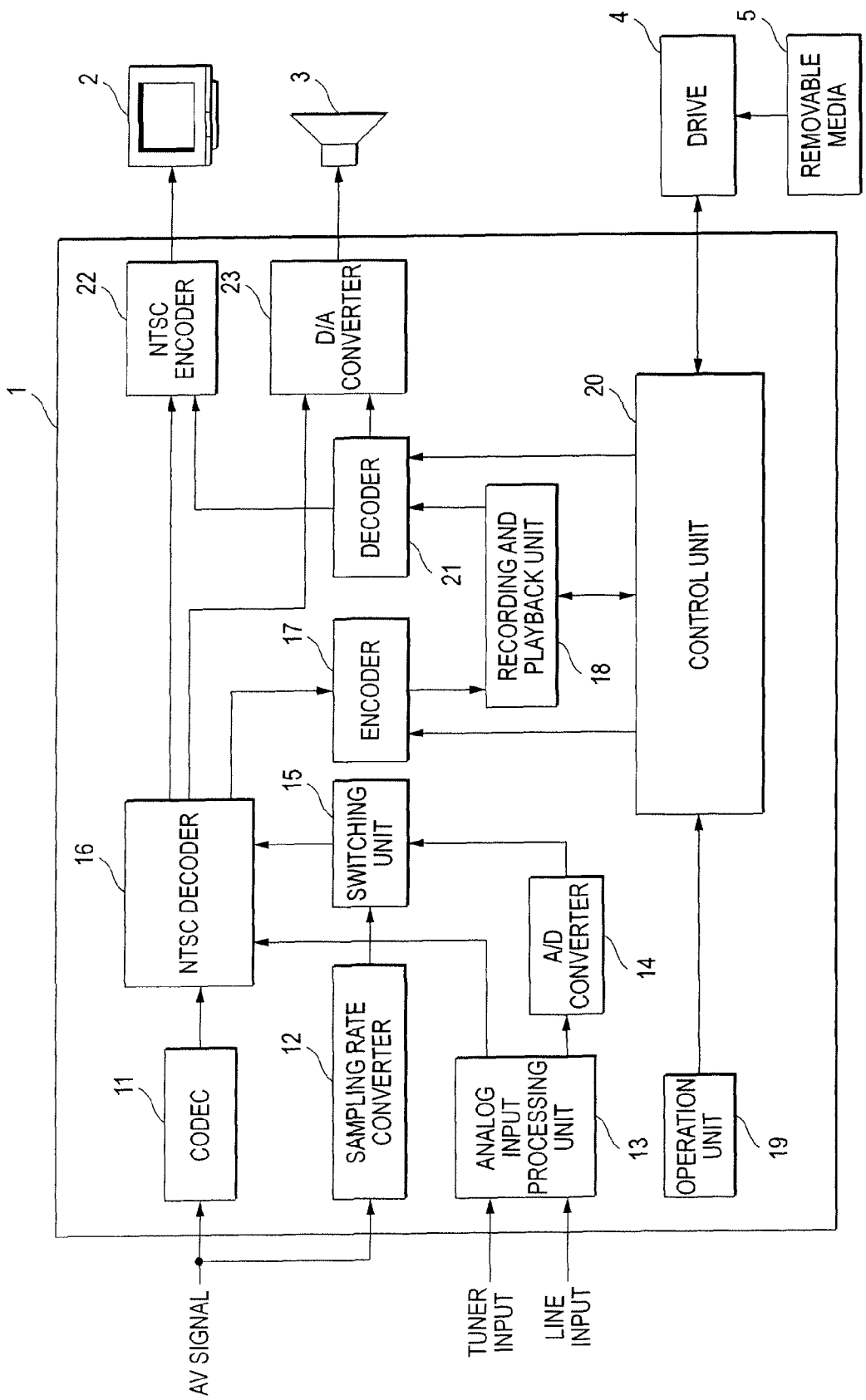
FIG. 1 is a block diagram showing an example of a HDD recorder according to an embodiment of the invention.

FIG. 1 is a block diagram showing a configuration example of a HDD recorder according to an embodiment of the invention.

The HDD recorder of FIG. 1 records and plays back an AV (Audio Video) signal supplied from a not-shown external apparatus, or, a video signal and an audio signal inputted as analog signals supplied from a not-shown analog tuner or a not-shown line tuner. The HDD recorder 1 outputs the played video signal to a monitor 2 connected to the outside. The HDD recorder also outputs the played audio signal to a speaker 3 connected to the outside.

The external apparatuses which supply the AV signal are, for example, the external apparatuses connected through i.LINK (Registered Trademark of Sony Corporation), a digital BS (Broadcasting Satellite) tuner, a digital CS (Communications Satellite) tuner, a digital video camera, a digital still camera, a scanner or the like.

A drive 4 is connected to the HDD recorder 1 if necessary. On the drive 4, removable media 5 such as a magnetic disc (including a flexible disc), an optical disc (including a CD-ROM (Compact Disc-Read Only Memory) and a DVD (Digital Versatile Disc)), a magneto-optical disc, or a semiconductor memory is mounted if necessary, which gives and receives data between them.

The HDD recorder 1 includes a codec 11, a sampling rate converter 12, an analog input processing unit 13, an A/D converter 14, a switching unit 15, a NTSC (National Television System Committee) decoder 16, an encoder 17, a recording and playback unit 18, an operation unit 19, a control unit 20, a decoder 21, a NTSC encoder 22, and a D/A converter 23.

The codec 11 decompresses a digital video signal in the AV signal supplied from the not-shown external apparatus to supply it to the NTSC decoder 16.

The sampling rate converter 12 converts a sampling rate of a digital audio signal in the AV signal supplied from the not-shown external apparatus into a different sampling rate.

The sampling rate converter 12 supplies the converted digital audio signal to the switching unit 15.

The analog input processing unit 13 selects one of the analog signals supplied from the not-shown analog tuner or the not-shown line tuner based on a signal indicating an operation by a user in the operation unit 19, which is supplied from the control unit 20. The analog input processing unit 13 supplies an analog video signal in the selected analog signal to the NTSC decoder 16. The analog input processing unit 13 also supplies an analog audio signal in the selected analog signal to the A/D converter 14.

The A/D converter 14 performs the A/D conversion on the analog audio signal supplied from the analog input processing unit 13. The A/D converter 14 supplies the digital audio signal resulting from the A/D conversion to the switching unit 15.

The switching unit 15 selects one of the digital audio signal supplied from the sampling rate converter 12 and the digital audio signal supplied from the A/D converter 14 based on a signal indicating an operation by a user in the operation unit 19, which is supplied from the control unit 20. The switching unit 15 supplies the selected digital audio signal to the NTSC decoder 16.

The NTSC decoder 16 converts the digital video signal supplied from the codec 11 or the analog video signal inputted from the analog input processing unit 13 into a digital video signal in a NTSC system. The NTSC decoder 16 synthesizes the converted digital video signal of the NTSC system and the digital video signal supplied from the switching unit 15.

When recording the video signal and the audio signal inputted to the HDD recorder 1, the NTSC decoder supplies a digital AV signal as the synthesized signal to the encoder 17. On the other hand, when the video signal and the audio signal inputted to the HDD recorder 1 are not recorded and are played back directly, the NTSC decoder 16 supplies the digital AV signal as the synthesized signal to the later-described NTSC encoder 22 and D/A converter 23.

The encoder 17 performs encode processing complying with a prescribed system such as an MPEG (Moving Picture Experts Group) system with respect to the digital AV signal supplied from the NTSC decoder. The encoder 17 supplies compressed and coded signal data as a result of the encode processing to the recording and playback unit 18.

The recording and playback unit 18 includes, for example, a hard disc, an optical disc or the like. The recording and playback unit 18 records the signal data supplied from the encoder 17. The recording and playback unit 18 also supplies the recorded signal data to the decoder 21. That is, the recording and playback unit 18 plays back the recorded signal data.

The operation unit 19 includes, for example, various kinds of operation buttons, keys or a touch panel. The user operates the operation unit 19 to input instructions for the HDD recorder 1. The operation unit 19 supplies a signal indicating the operation by the user to the control unit 20 according to the operation by the user.

The control unit 20 includes, for example, a microprocessor and the like, which controls the whole HDD recorder 1 based on the signal indicating the operation of the user supplied from the operation unit 19.

The decoder 21 performs decode processing complying with the above system such as an MPEG (Moving Picture Experts Group) system with respect to the signal data supplied from the recording and playback unit 18. The decoder 21 supplies a digital video signal in the decompressed and decoded digital AV signals as a result of the processing to the NTSC encoder 22. The decoder 21 also supplies a digital audio signal in the decompressed and decoded digital AV signals as a result of the processing to the D/A converter 23.

The NTSC encoder 22 converts the digital video signal supplied from the decoder 21 into a video signal of the NTSC system. The NTSC encoder 22 supplied the converted video signal to the monitor 2.

The D/A converter 23 performs D/A conversion on the digital audio signal supplied from the decoder 21. The D/A converter 23 supplies the audio signal resulting from the conversion to the speaker 3.

According to the above configuration, the HDD recorder 1 is capable of recording and playing back the inputted video signal and audio signal.

FIG. 2 is a block diagram showing configuration examples of the recording and playback unit 18 and the control unit 20 of the HDD recorder 1 of FIG. 1.

The recording and playback unit 18 includes an image database 31, a template database 32, a content database 33 and a dictionary database 34. Hereinafter, the image database 31 is referred to as the image DB 31, the template database 32 is referred to as the template DB 32, the content database is referred to as the content DB 33 and the dictionary database is referred to as the dictionary DB 34.

The image DB 31 stores image data as data of images supplied from the encoder 17 of FIG. 1 by associating it with metadata indicating an attribute of images.

The template DB 32 records, when displaying a scrap book as a content to be recorded in the content DB 33, a background template which is background image data to be a background of images arranged in the scrap book, an arrangement template which is information for setting an arrangement of images in the scrap book, and metadata indicating the attribute of the background template or the arrangement template by associating them.

The content DB 33 records data of scrap books which are the contents in which images divided into groups by metadata are arranged according to the groups. The details of the content will be described later.

The dictionary DB 34 records data of various dictionaries as words, such as a Japanese dictionary, an English-Japanese dictionary, a Japanese-English dictionary and a thesaurus.

The control unit 20 includes a selection unit 51, a recording and playback control unit 52, a display control unit 53, a feature extraction unit 54, an image determination unit 55, a metadata addition unit 56, a metadata extraction unit 57, a content creation unit 58, a number-of-common metadata determination unit 59, and a synonym acquisition unit 60.

The selection unit 51 supplies information indicating instructions operated by the user to the recording and playback control unit 52 based on a signal indicating the operation by the user, which is supplied from the operation unit 19.

The selection unit 51 supplies information indicating images, a background template, or a content which is selected by the user to the recording and playback control unit 52, based on a signal indicating the operation by the user for selecting the image, the background template or the scrap book displayed on the monitor 2, which is supplied from the operation unit 19.

The selection unit 51 supplies information indicating a designated folder selected by the user to the recording and playback control unit 52, based on a signal indicating the operation by the user for selecting the designated folder in which images are stored, which is supplied from the operation unit 19.

The selection unit 51 selects the designated image data from image data of images read out by the recording and playback control unit 52.

In addition, the selection unit 51 supplies information indicating a threshold which is set by the user to the number-of-common metadata determination unit 59, based on a signal indicating the operation by the user for setting the threshold for determining the number of images to which the same metadata is added, which is supplied from the operation unit 19.

The recording and playback control unit 52 controls the recording or playback performed by the recording and playback unit 18. The recording and playback control unit 52 reads out image data, background templates, arrangement templates or data of scrap books from the recording and playback unit 18.

The recording and playback control unit 52 reads out image data stored in the designated folder based on information indicating the designated folder selected by the user, which is supplied from the selection unit 51.

The recording and playback control unit 52 supplies the read-out image data to the feature extraction unit 54. The recording and playback control unit 52 also stores image data which is newly read out and to which metadata supplied from the metadata addition unit 56 is added in the recording and playback unit 18.

In addition, the recording and playback control unit 52 supplies the read-out image data, background templates, arrangement templates, or data of scrap books to the content creation unit 58.

The display control unit 53 controls decode processing in the decoder 21 based on the image data, background templates, arrangement templates or data of scrap books read out by the recording and playback control unit 52.

The feature extraction unit 54 extracts features of images in image data supplied from the recording and playback control unit 52. Specifically, the feature extraction unit 54 extracts features at edges and even parts of an image in image data supplied from the recording and playback control unit 52. The feature extraction unit 54 also extracts an area of a character string included in the image of image data supplied from the recording and playback control unit 52.

Furthermore, the feature extraction unit 54 includes a character recognition unit 71. The character recognition unit 71 recognizes characters in the extracted area of the character string.

The feature extraction unit 54 supplies a feature amount which represents the amount of features at edges and even parts of the extracted image and the recognized characters of the character string to the image determination unit 55.

The image determination unit 55 determines whether the image read out by the recording and playback control unit 52 is an image of the face of a certificate, a receipt, a ticket or a note on which the character string is written, based on the feature amount representing the amount of features at edges and even parts of the image and the recognized characters of the character string supplied from the feature extraction unit 54. When it is determined that the image read out by the recording and playback control unit 52 is an image of the face of a certificate, a receipt, a ticket or a note on which the character string is written, the image determination unit 55 acquires character string data based on the recognized characters of the character string.

The image determination unit 55 supplies the acquired character string data to the metadata addition unit 56.

The metadata addition unit 56 supplies metadata which is the character string data supplied from the image determination unit 55 to the recording and playback control unit 52. Specifically, the metadata addition unit 56 adds character string data supplied from the image determination unit 55, as metadata, to the image data which is newly read out by the recording and playback control unit 52.

The metadata extraction unit 57 extracts metadata added to the image data read out by the recording and playback control unit 52. The metadata extraction unit 57 supplies the extracted metadata to the content creation unit 58.

In addition, the metadata extraction unit 57 determines whether there is common metadata in the extracted metadata. When it is determined that there is common metadata, the metadata extraction unit 57 calculates the number-of-common metadata, that is, the number of images to which the same metadata is added and supplies it to the number-of-common metadata determination unit 59. The metadata extraction unit 57 supplies the common metadata to the content creation unit 58.

The content creation unit 58 creates a scrap book as a content in which plural images read out by the recording and playback control unit 52 and divided into groups according to metadata or synonyms are arranged by the groups, based on the metadata supplied from the metadata extraction unit 57 or the synonyms supplied from the later-described synonym acquisition unit 60. The content creation unit 58 includes a computing unit 72 and a template setting unit 73.

The computing unit 72 divides plural images into groups according to metadata or synonyms based on the metadata supplied from the metadata extraction unit 57 or synonyms supplied from the synonym acquisition unit 60. The computing unit 72 includes a clustering unit 91 and a hierarchy decision unit 92.

The clustering unit 91 performs clustering of images based on the metadata supplied from the metadata extraction unit 57 or the synonyms supplied from the synonym acquisition unit 60. An exemplary clustering unit is described in U.S. patent application Ser. No. 11/523,515 (filed Sep. 20, 2006), which is incorporated by reference herein.

The hierarchy decision unit 92 decides cluster hierarchies as a result of the clustering by the clustering unit 91 based on the metadata supplied from the metadata extraction unit 57 or the synonyms supplied from the synonym acquisition unit 60.

The process of dividing plural images into groups according to metadata by the computing unit 72 will be explained with reference to FIG. 3 and FIG. 4.

Figure 3:
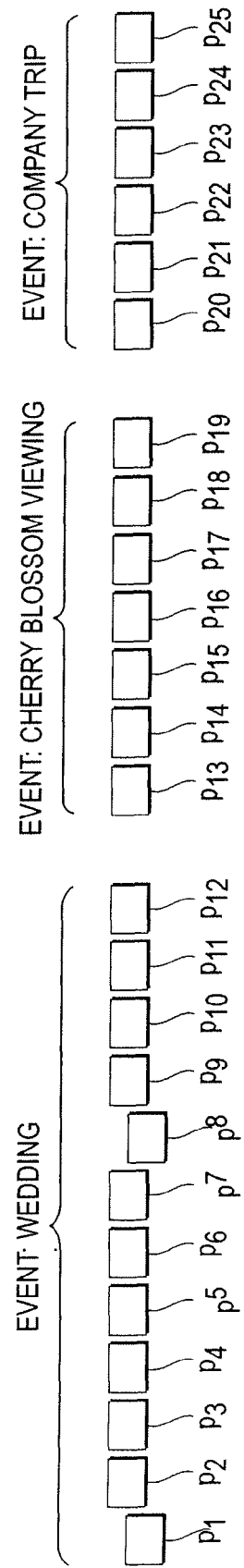
FIG. 3 is a view showing an example of clusters of images.

FIG. 3 is a view showing an example of groups (clusters) of images.

In FIG. 3, images p1 to p25 show images recorded in the image DB 31 in the recording and playback unit 18. One rectangle in FIG. 3 represents one image. However, images of any shape may be used when practicing the present invention. In addition, metadata are added to images p1 to p25, respectively.

In the example of FIG. 3, "wedding" is added as metadata representing an event to images p1 to p12. "Cherry blossom viewing" is added as metadata representing an event to images p13 to p19. "Company trip" is added as metadata representing an event to images p20 to p25.

The clustering unit 91 performs clustering of images based on metadata representing the event which is added to images P1 to p25.

Specifically, as shown in FIG. 3, the clustering unit 91 generates a cluster including images p1 to p12, a cluster including images p13 to p19 and a cluster including images p20 to p25.

FIG. 4 is a view showing an example in which clustering is further performed with respect to the groups (clusters) of images in FIG. 3.

The images p1 to p15 have metadata other than metadata representing events "wedding", "cherry blossom viewing" and "company trip". Specifically, the images p1 to p25 include metadata of "wedding at the church", "reception", "after-party", "cherry blossom", "feast", "dog" and "hot-spring".

The clustering unit 91 performs clustering of images based on metadata representing events added to images p1 to p25. The hierarchy decision unit 92 decides cluster hierarchies as a result of clustering by the clustering unit 91 based on "wedding", "cherry blossom viewing" and "company trip" as metadata representing events, as well as "wedding at the church", "reception", "after-party", "cherry blossom", "feast", "dog" and "hot-spring" as metadata of sub-events which are events in a lower layer of events.

Specifically, as shown in FIG. 4, the clustering unit 91 and the hierarchy decision unit 92 generate a cluster including images p1 to p3, a cluster including images p4 to p7, a cluster including images p8 to p12, a cluster including images p13 to p14, a cluster including images p15 to p17, a cluster including images p18 to p19, a cluster including images p20 to p22, and a cluster including images p23 to p25.

The clusters generated as the above form pages of a scrap book to be created.

Returning to FIG. 2, the template setting unit 73 allows the recording and playback control unit 52 to read out background templates and arrangement templates from the recording and playback unit 18, depending on metadata supplied from the metadata extraction unit 57 or synonyms supplied from the synonym acquisition unit 60. The template setting unit 73 sets the read-out background templates and the arrangement templates to the generated clusters.

The content creation unit 58 stores scrap books in the content DB 33 of the recording and playback unit 18 through the recording and playback control unit 52, in which plural images divided into groups according to metadata or synonyms are arranged by groups, and the background templates and the arrangement templates are set.

The number-of-common metadata determination unit 59 determines whether the number of images to which the same metadata is added and which are supplied from the metadata extraction unit 57, is not less than the prescribed threshold acquired from the selection unit 51. When it is determined that the number of images to which the same metadata is added is not less than the prescribed threshold, the number-of-common metadata determination unit 59 supplies information to the content creation unit 58, which indicates that the number of images to which the same metadata is added is not less than the prescribed threshold to the content creation unit 58.

The synonym acquisition unit 60 acquires synonyms of metadata for every image to which metadata is added. Specifically, synonyms of metadata added to image data which is read out by the recording and playback control unit 52 are acquired from the dictionary DB 34 in the recording and playback unit 18. The synonym acquisition unit 60 supplies the acquired synonyms to the content creation unit 58.

Next, the process of adding metadata in the HDD recorder 1 will be explained.

The control unit 20 of the HDD recorder 1 starts the process when images are recorded in a designated folder in the recording and playback unit 18.

FIG. 5 is a flowchart showing an example of the process of adding metadata in the HDD record 1.

In step S11, the recording and playback control unit 52 records image data of images recorded in the designated folder in the recording and playback unit 18. The selection unit 51 selects certain image data from image data read out by the recording and playback control unit 52. The recording and playback control unit 52 supplies the selected image data to the feature extraction unit 54.

In step S12, the feature extraction unit 54 extracts features at edges and even parts of an image in image data supplied from the recording and playback control unit 52. The feature extraction unit 54 is capable of extracting a feature of pattern repetition in the image of image data or extracting a feature of the dynamic range or activity of images. That is, the feature extraction unit 54 extracts features which can be used when discriminating an image of a certificate, a receipt, a ticket or a note from an image of persons or landscapes.

In step S13, the feature extraction unit 54 extracts an area of a character string included in the image of image data supplied from the recording and playback control unit 52. For example, the feature extraction unit 54 extracts the area of the character string based on positions of edges detected in the step S12, the topology of the area surrounded by the detected edges and the like.

In step S14, the character recognition unit 71 recognizes of characters of the character string included in the image of the extracted area. The feature extraction unit 54 supplies a feature amount which represents the amount of features at edges and even parts of the extracted image and characters of the recognized character string to the image determination unit 55.

In step S15, the image determination unit 55 determines whether the image read out by the recording and playback control unit 52 is an image of the face of a certificate, a receipt, a ticket or a note on which the character string is written, based on the feature amount representing the amount of features at edges and even parts of the image and recognized characters of the character string supplied from the feature extraction unit 54. That is, the image determination unit 55 determines whether the selected image is an image of a certificate, a receipt, a ticket and a note, or an image of persons or landscapes. For example, in the case that 20 or more characters having almost the same size are included in the image, or in the case that 10 or more characters having almost the same size are included in the image, edges in characters occupy 80% or more of all edges and the even parts occupy 60% or more of the image, the image determination unit 55 determines that the image is one of the face of a certificate, a receipt, a ticket or a note.

In step S15, when it is determined that the image read out by the recording and playback control unit 52 is the image of the face of a certificate, a receipt, a ticket or a note on which the character string is written, the process proceeds to step S16.

In step S16, the image determination unit 55 acquires character string data based on the recognized character string. The image determination unit 55 supplies the acquired character string data to the metadata addition unit 56.

In step S17, the selection unit 51 selects another image data from image data read out by the recording and playback control unit 52.

In step S18, the metadata addition unit 56 supplies metadata which is the character string data supplied from the image determination unit 55 to the recording and playback control unit 52. Specifically, the metadata addition unit 56 adds character string data supplied from the image determination unit 55, as metadata, to another image of the image data which is newly read out by the recording and playback control unit 52, and the process ends.

On the other hand, in step S15, when it is determined that the image read out by the recording and playback control unit 52 is not the image of the face of a certificate, a receipt, a ticket or a note on which the character string is written, the process ends.

Returning to the step S11, it is also preferable that a next image is selected from the read out images and the above processes are sequentially applied with respect to all read-out images.

As described above, the HDD recorder 1 can add character string data of the character string of the face of a receipt, a ticket or a note to another image, as metadata.

Next, the process of creating a scrapbook in the HDD recorder 1 will be explained.

The control unit 20 of the HDD recorder 1 starts the process when, for example, the operation unit 19 is operated and the control unit 20 receives an instruction for the process of creating the scrap book.

FIG. 6 is a flowchart showing an example of the process of creating scrap books in the HDD recorder 1.

In step S31, the selection unit 51 supplies information indicating a designated folder selected by the user to the recording and playback control unit 52 based on a signal indicating the operation of the user for selecting the designated folder in which images are stored, which is supplied from the operation unit 19. The recording and playback control unit 52 reads out image data stored in the designated folder based on information indicating the designated folder selected by the user, which is supplied from the selection unit 51. The recording and playback control unit 52 supplies the read-out image data to the metadata extraction unit 57 and the content creation unit 58.

In step S32, the content creation unit 58 determines whether a scrap book is created automatically. Specifically, the content creation unit 58 determines whether the scrap book is created automatically based on a signal indicating an operation by the user for selecting whether the scrap book is created automatically, for example, a click of an automatic creation button, which is supplied from the operation unit 19.

When it is determined that the scrap book is created automatically in step S32, the process proceeds to step S33.

In step S33, the metadata extraction unit 57 extracts metadata added to image data which is stored in the designated folder read out by the recording and playback control unit 52. The metadata extraction unit 57 supplies the extracted metadata to the content creation unit 58.

In step S34, the computing unit 72 in the content creation unit 58 performs clustering of images according to events based on the extracted metadata. That is, the clustering unit 91 divides images into groups based on metadata representing events, which are added to image data stored in the designated folder.

In step S35, the template setting unit 73 in the content creation unit 58 reads out background templates to which metadata corresponding to respective clustered events are added. That is, the template setting unit 73 allows the recording and playback control unit 52 to read out background templates from the recording and playback unit 18, depending on metadata supplied from the metadata extraction unit 57.

In step S36, the template setting unit 73 sets the read-out background templates, namely, the background templates to which metadata corresponding to events are added with respect to the clustered event clusters.

Figure 7:
FIG. 7 is a view showing examples of background templates.

FIG. 7 is a view showing a configuration example of the background templates. Background templates 111-1 to 111-3 shown in FIG. 7 include metadata, respectively. The template setting unit 73 sets the background templates having metadata corresponding to metadata added to image data generating event clusters which are clusters according to events.

In step S37, the computing unit 72 performs clustering of images according to sub-events, based on metadata added to images of respective events. That is, the computing unit 72 divides images into groups according to sub-events to divide images in pages according to the sub-events.

In step S38, the template setting unit 73 reads out arrangement templates according to pages, depending on the number of images clustered according to respective sub-events.

In step S39, the template setting unit 73 sets the read-out arrangement templates according to pages to respective pages.

Figure 8:
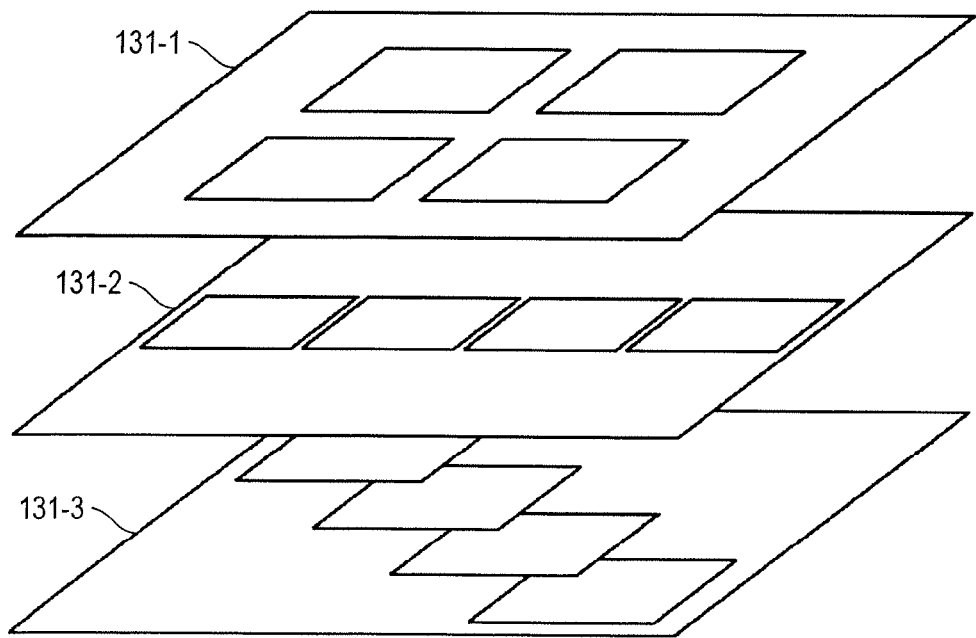
FIG. 8 is a view showing examples of arrangement templates.

FIG. 8 is a view showing a configuration example of arrangement templates. The arrangement templates 131-1 to 131-3 shown in FIG. 8 include metadata, respectively. The template setting unit 73 sets arrangement templates corresponding to metadata added to image data generating sub-event clusters which are clusters according to sub-events, and the number of images in respective pages of sub-events.

Figure 9:
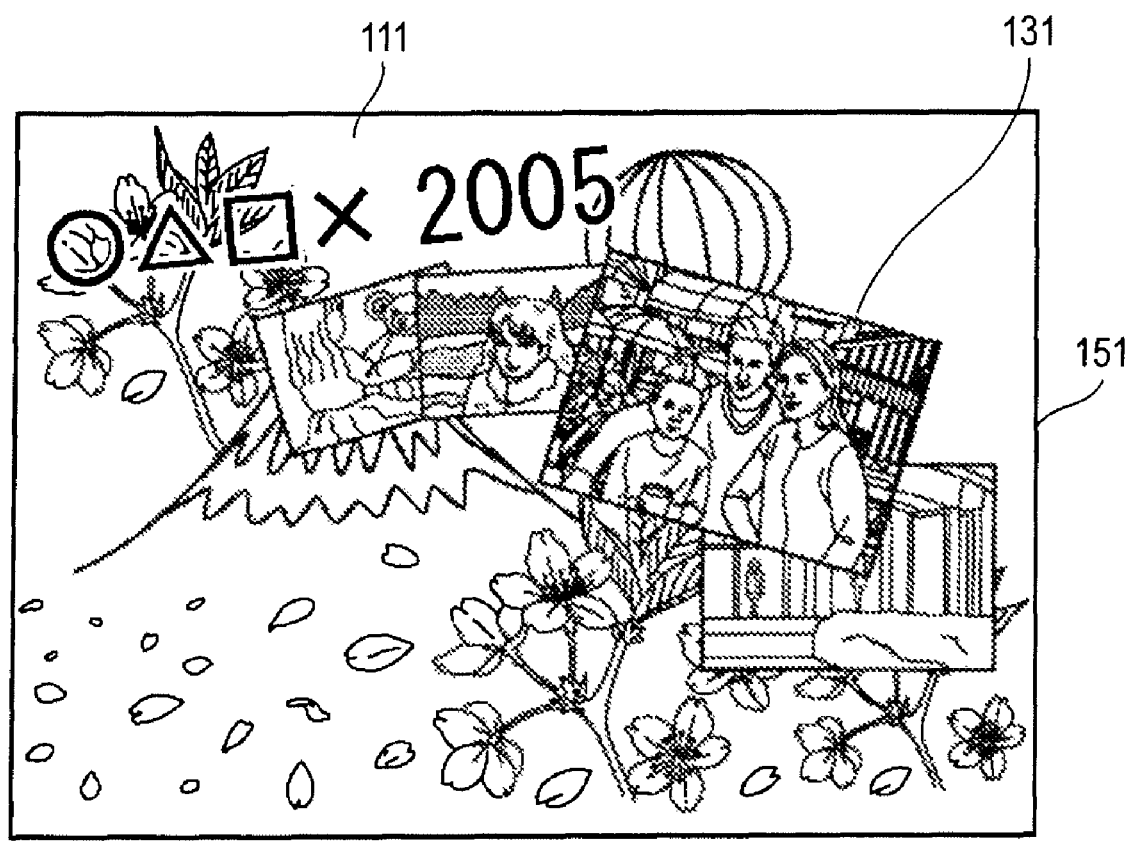
FIG. 9 is a view showing a configuration example of a designated page in the scrap book.

FIG. 9 is a view showing a configuration example of a designated page in a scrap book to be created.

In the example of FIG. 9, a background template 111 and an arrangement template 131 are set in a page 151. The background template 111 has the same metadata as, for example, metadata of four images arranged in the page 151. According to the arrangement template 131, an arrangement of, for example, four images is possible. In addition, a comment "○△□×2005" is displayed in the page 151. The user can set an arbitrary comment at an arbitrary position in the page 151 by operating the operation unit 19.

In step S40, the content creation unit 58 supplies and records the scrap book in the content DB 33 of the recording and playback unit 18 through the recording and playback control unit 52, in which plural images divided into groups according to metadata are arranged by groups, and background templates and the arrangement templates are set, then, the process ends.

Figure 10:
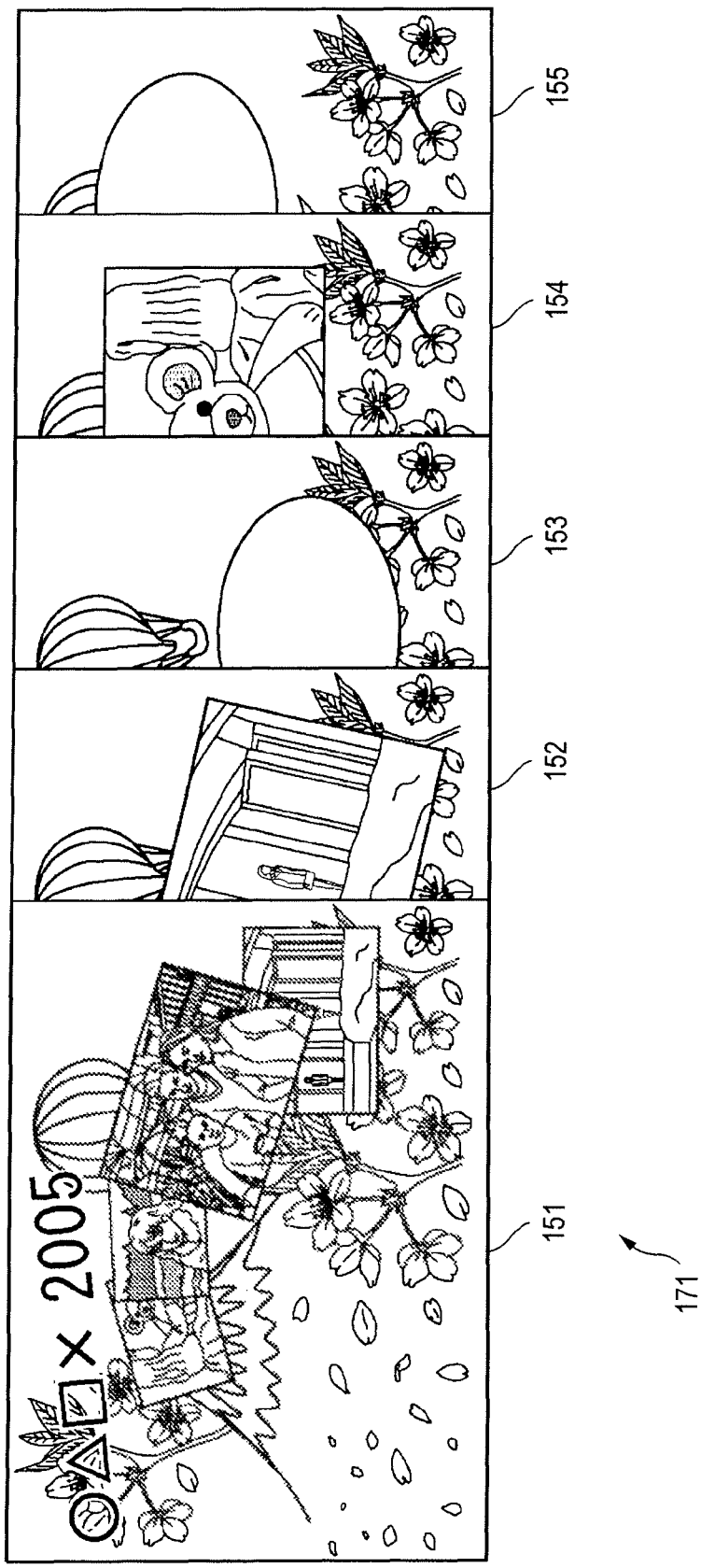
FIG. 10 is a view showing a configuration example of the scrap book.

FIG. 10 is a view showing a configuration example of a scrap book to be created.

In the example of FIG. 10, a scrap book 171 includes 5 pages from page 151 to page 155. All images arranged in the page 151 to the page 155 of the scrap book 171 include metadata representing the same event. The background template 111 corresponding to the metadata is set in the scrap book 171. The page 151 is a front page of the scrap book 171. The designated numbers of images to be included respectively with arrangement templates 131 are arranged in the page 152 to the page 155 in the same way as the page 151.

It is also preferable that an image of the face of a certificate, a receipt, a ticket or a note is arranged in at least one of the pages 151 to 155.

On the other hand, in step S32, when it is determined that the scrap book is not created automatically, the process proceeds to step S41. In step S41 to step S46, the scrap book is created manually.

In step S41, the selection unit 51 supplies information indicating images in the designated folder which is selected by the user to the recording and playback control unit 52, based on a signal indicating the operation by the user for selecting images from the read-out folder, which is supplied from the operation unit 19. The recording and playback control unit 52 reads out image data stored in the designated folder and selected by the user, based on information indicating images selected by the user, which is supplied from the selection unit 51. The recording and playback control unit 52 supplies the selected image data to the content creation unit 58.

In step S42, the computing unit 72 in the content creation unit 58 groups image data selected in the step S41 in one cluster.

In step S43, the selection unit 51 supplies information indicating a background template selected by the user to the recording and playback control unit 52, based on a signal indicating the operation by the user for selecting the background template, which is supplied from the operation unit 19.

In step S44, the recording and playback control unit 52 reads out the background template from the recording and playback unit 18, based on information indicating the background template selected by the user, which is supplied from the selection unit 51.

In step S45, the template setting unit 73 acquires the selected background template from the recording and playback control unit 52. The template setting unit 73 sets the background template acquired from the recording and playback control unit 52 to the cluster in which images are grouped.

In step S46, the computing unit 72 performs clustering of images according to sub-events based on metadata added to the images of the group, dividing images to pages according to sub-events, and the process proceeds to the step S38.

Accordingly, the HDD recorder 1 is capable of creating the scrap book in which plural images divided into group according to metadata are arranged by groups.

The scrap book may be formed by combination of image data newly generated from image data, or the scrap book may be edited data which is data designating display positions of images by referring image data.

Furthermore, the scrap book may link to plural other scrap books. Specifically, scrap books can link to each other by, for example, associating prescribed metadata to each other, which are added to images arranged in respective scrap books. It is also preferable that, for example, scrap books in which the same image is arranged are allowed to link to each other.

Next, the process of automatic generation of a scrap book in the HDD recorder 1 will be described.

The control unit 20 of the HDD recorder 1 performs the process of automatic generation of the scrap book when, for example, an image is added to the image DB 31 in the recording and playback unit 18. It is preferable that the process of automatic generation of the scrap book is performed when, for example, the number of images recorded in the image DB 31 becomes a prescribed number. Also it is preferable that the process of automatic generation of the scrap book is performed, for example, at a predetermined interval.

FIG. 11 is a flowchart showing an example of the process of automatic generation of the scrap book in the HDD recorder 1.

Instep S61, the recording and playback control unit 52 reads out all image data which is not stored in the scrap book from the recording and playback unit 18. The metadata extraction unit 57 extracts metadata added to all image data which is not stored in the scrap book read out by the recording and playback control unit 52.

In step S62, the metadata extraction unit 57 determines whether there is common metadata in the extracted metadata. That is, the metadata extraction unit 57 determines whether there are images to which common metadata is added.

In step S62, when it is determined that there is common metadata, the metadata extraction unit 57 calculates the number-of-common metadata, namely, the number of images to which the same metadata is added, supplying the number to the number-of-common metadata determination unit 59, then, the process proceeds to step S63.

In step S63, the number-of-common metadata determination unit 59 determines whether the number of images to which the same metadata is added and which is supplied from the metadata extraction unit 57 is not less than a prescribed threshold acquired from the selection unit 51. In step S63, when it is determined that the number of images to which the same metadata is added is not less than the prescribed threshold, the number-of-common metadata determination unit 59 supplies information to the content creation unit 58, which indicates that the number of images to which the same metadata is added is not less than the prescribed threshold, and the metadata extraction unit 57 supplies the common metadata to the content creation unit 58, then, the process proceeds to the step S64.

In step S64, the content creation unit 58 acquires image data to which the common metadata is added in image data not stored in the scrap book read out by the recording and playback control unit 52, based on the common metadata supplied from the metadata extraction unit 57 depending on information indicating that the number of images to which the same metadata is added supplied from the number-of-common metadata determination unit 59 is not less than the prescribed threshold.

In step S65, the synonym acquisition unit 60 acquires synonyms of metadata added to the image data to which common metadata is added and which is read out by the recording and playback control unit 52, from the dictionary DB 34 in the recording and playback unit 18. The synonym acquisition unit 60 supplies the acquired synonyms to the content creation unit 58. The template setting unit 73 reads out a background template to which metadata supplied from the metadata extraction unit 57 or metadata corresponding to synonyms supplied from the synonym acquisition unit 60 is added, based on metadata supplied from the metadata extraction unit 57 or synonyms supplied from the synonym acquisition unit 60.

In step S66, the template setting unit 73 sets the read-out background template to images to which the common metadata is added.

In step S67, the computing unit 72 performs clustering of images according to sub-events based on other metadata added to images to which the common metadata is added.

Processes from step S68 to step S70 in the flowchart of FIG. 11 are same as the respective processes from step S38 to step S40 in the flowchart of FIG. 6, therefore, explanation thereof is omitted.

In step S71, the metadata extraction unit 57 determines whether there is not other common metadata in the extracted metadata. When it is determined that there is not other common metadata in step S71, the process ends.

On the other hand, in step S71, when it is determined that there is another common metadata, the process returned to step S63, and processes after the step S63 will be repeated.

When it is determined that there is not common metadata in the step S62, the process ends. Further, in step S63, when it is determined that the number of images to which the same metadata is added is less than the prescribed threshold, the process ends.

Accordingly, the HDD recorder 1 is capable of automatically generating the scrap book including images to which the common metadata is added when the number of images to which the common metadata is added becomes the prescribed threshold or more.

Next, the process of adding an image to a scrap book in the HDD recorder 1 will be explained.

The control unit 20 of the HDD recorder 1 performs the process of adding the image to the scrap book when, for example, an image is added to the image DB 31 in the recording and playback unit 18. It is also preferable that the process of adding the image to the scrap book when, for example, the number of images recorded in the image DB 31 becomes a prescribed number. Also it is preferable that the process of adding the image to the scrap book, for example, at a predetermined interval.

Figure 12:
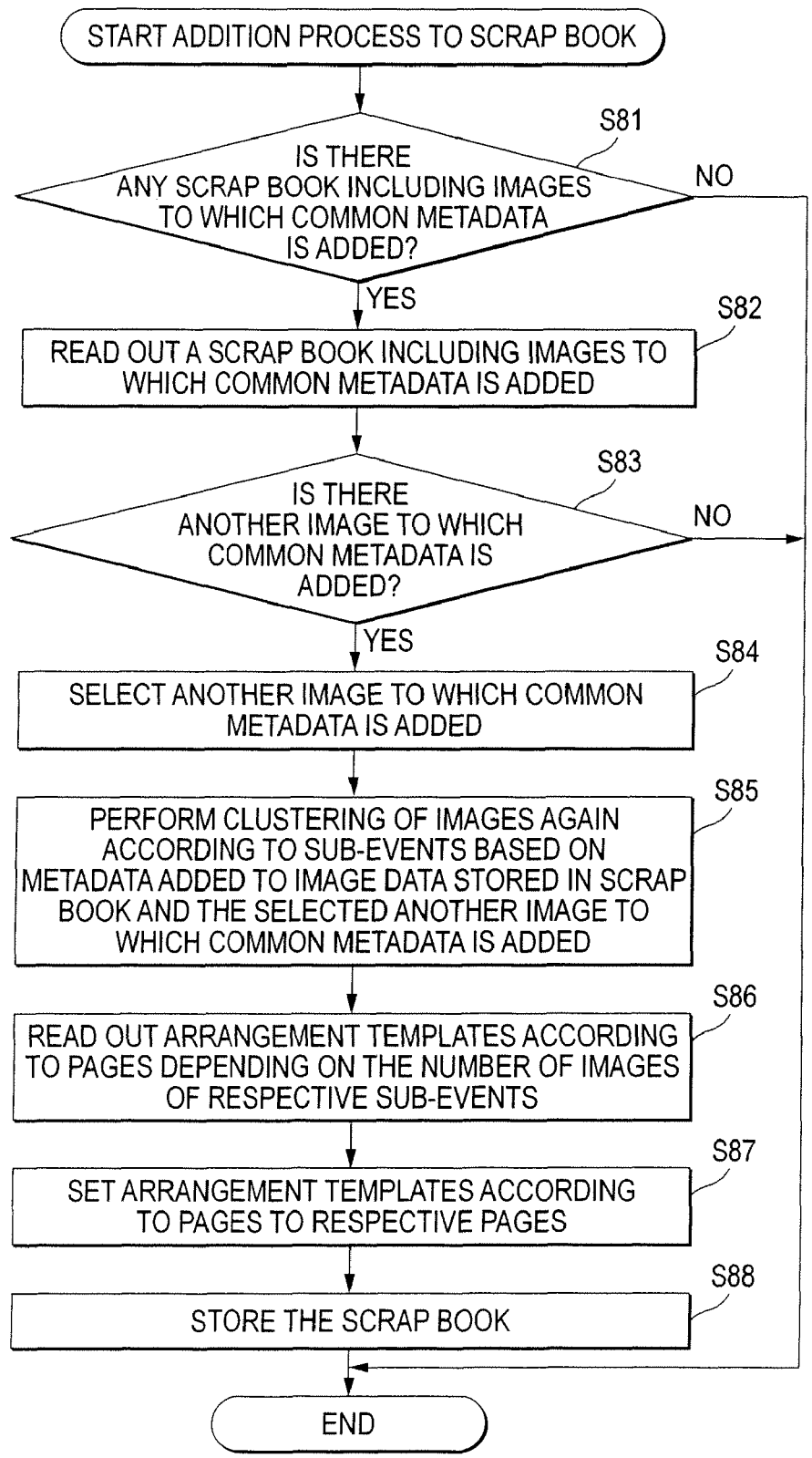
FIG. 12 is a flowchart explaining an example of the process of adding an image to the scrap book.

FIG. 12 is a flowchart showing an example of the process of adding an image to the scrap book in the HDD recorder 1.

In step S81, the recording and playback control unit 52 determines whether there is a scrap book including images to which common metadata is added. For example, the recording and playback control unit 52 determines whether there is the scrap book including images to which the common metadata is added by referring history information indicating that the scrap book including images to which the common metadata is added has been generated, in the process of creating the scrap book in FIG. 11. In step S81, when it is determined that there is a scrap book to which the common metadata is added, the process proceeds to step S82.

In step S82, the recording and playback control unit 52 reads out a scrap book including images to which common metadata is added from the recording and playback unit 18, based on history information indicating that the scrap book to which the common metadata is added has been generated. The recording and playback control unit 52 also reads out all image data not stored in the scrap book. The metadata extraction unit 57 extracts metadata of the read-out scrap book and metadata added to all image data not stored in the scrap book.

In step S83, the metadata extraction unit 57 determines whether there is common metadata added to the scrap book in the extracted metadata added to all image data not stored in the scrap book. That is, the metadata extraction unit 57 determines whether there is another image to which common metadata is added.

In step S83, when it is determined that there is common metadata, the metadata extraction unit 57 supplies the common metadata to the content creation unit 58, then, the process proceeds to step S84.

In step S84, the content creation unit 58 selects another image data to which the common metadata is added from image data not stored in the scrap book read out by the recording and playback control unit 52, based on the common metadata supplied from the metadata extraction unit 57. The content creation unit 58 also selects image data stored in the scrap book including images to which the common metadata is added.

In step S85, the computing unit 72 performs clustering of images according to sub-events based on metadata added to image data stored in the scrap book and another image to which the common metadata is added.

Processes from step S86 to S88 in the flowchart of FIG. 12 are the same as the respective processes from step S38 to step S40 in the flowchart of FIG. 6, therefore, explanation thereof will be omitted.

On the other hand, when it is determined that there is not a scrap book including images to which common metadata is added in step S81, the process ends.

In step S83, when it is determined that there is not common metadata, the process ends.

Accordingly, the HDD recorder 1 is capable of adding the image to the scrap book which has already been generated and includes images to which common metadata is added.

In the above description, the HDD recorder 1 creates the scrap book based on metadata previously added to image data, however, it is also preferable to newly add metadata to the created scrap book.

The process of adding metadata to the scrap book in the HDD recorder 1 will be explained more specifically.

The control unit 20 of the HDD recorder 1 starts the process when, for example, the operation unit 19 is operated and the control unit 20 acquires an instruction for the process of adding metadata.

Figure 13:
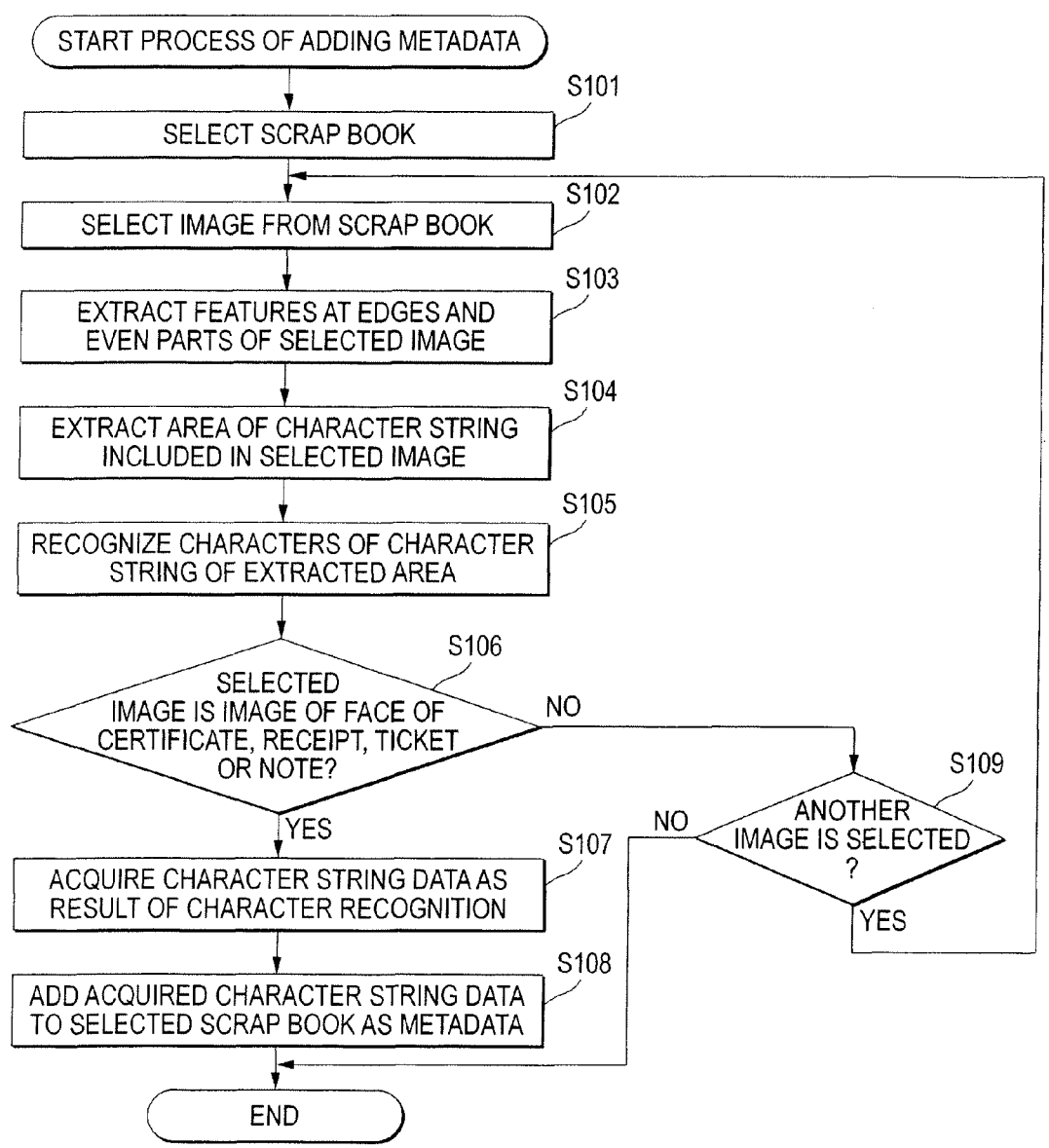
FIG. 13 is a flowchart explaining another example of the process of adding metadata.

FIG. 13 shows an example of the process of adding metadata to the scrap book in the HDD recorder 1.

In step S101, the selection unit 51 supplies information to the recording and playback control unit 52, which indicates a scrap book selected by the user based on a signal indicating the operation by the user for selecting the scrap book displayed on the monitor 2, which is supplied from the operation unit 19. The recording and playback control unit 52 reads out data of the scrap book selected by the user from the recording and playback unit 18 based on the supplied information indicating the scrap book selected by the user.

In step S102, the selection unit 51 selects a designated image data from data of the scrap book read out by the recording and playback control unit 52. The recording and playback control unit 52 supplies the selected image data to the feature extraction unit 54.

Since processes from step S103 to step S105 in the flowchart of FIG. 13 are the same as the respective processes of step S12 to step S14 in the flowchart of FIG. 5, the explanation thereof will be omitted.

In step S106, when it is determined that the image read out by the recording and playback control unit 52 is an image of the face of a certificate, a receipt, a ticket or a note on which a character string is written, the process proceeds to step S107.

In step S107, the image determination unit 55 acquires character string data based on the recognized character string. The image determination unit 55 supplies the acquired character string data to the metadata addition unit 56.

In step S108, the metadata addition unit 56 supplies metadata which is the character string data supplied from the image determination unit 55 to the recording and playback control unit 52. Specifically, the character string data supplied from the image determination unit 55 is added to the scrap book read out by the recording and playback control unit 52 as metadata, then, the process ends.

On the other hand, in step S106, when it is determined that the image read out by the recording and playback control unit 52 is not an image of the face of a certificate, a receipt, a ticket or a note on which a character string is written, the process proceeds to step S109.

In step S109, the selection unit 51 supplies information to the recording and playback control unit 52, which indicates whether another image is selected from the scrap book, based on a signal indicating the operation by the user for representing whether another image is selected from the scrap book, which is supplied from the operation unit 19. That is, the recording and playback control unit 52 determines whether another image is selected from the scrap book.

In step S109, when it is determined that another image is selected from the scrap book, the process returns to step S102, and processes after the step S102 will be repeated.

On the other hand, when it is determined that another image is not selected from the scrap book in the step S109, the process ends.

Accordingly, the control unit 20 is capable of adding character string data to the scrap book as metadata, which is the character string of the image of the face of a certificate, a receipt, a ticket or a note which is stored in the scrap book.

Next, the process of displaying a scrap book in the HDD recorder 1 will be explained.

The control unit 20 of the HDD recorder 1 starts the process when, for example, the operation unit 19 is operated and the control unit 20 acquires an instruction for the process of displaying the scrap book.

Figure 14:
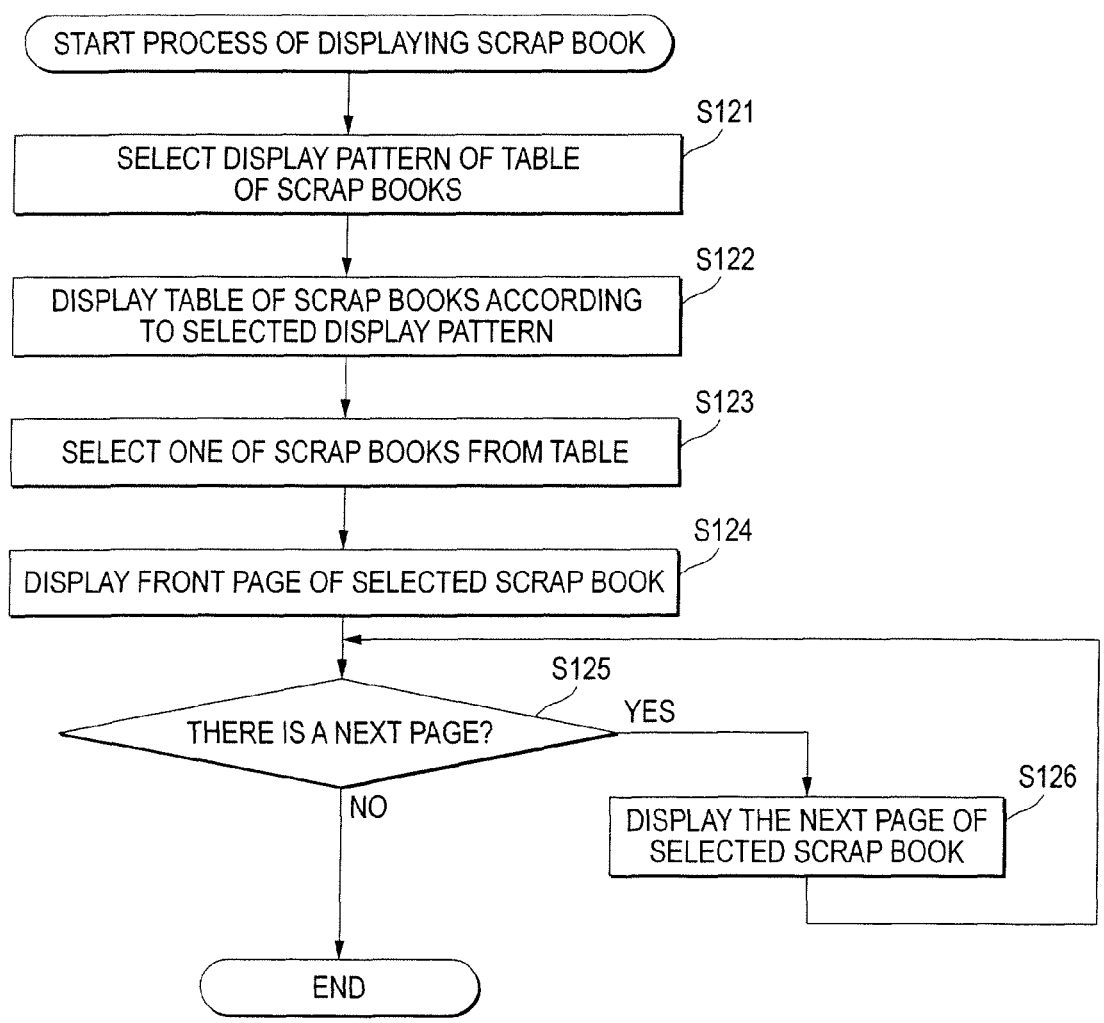
FIG. 14 is a flowchart explaining an example of the process of displaying the scrap book.

FIG. 14 is an example of a flowchart showing the process of displaying the scrap book.

In step S121, the selection unit 51 supplies information to the recording and playback control unit 52, which indicates a display pattern of a table on which scrap books to be selected by the user are displayed, based on a signal indicating the operation by the user for selecting the display pattern of the table on which scrap books displayed on the monitor 2 are displayed, which is supplied from the operation unit 19.

In step S122, the recording and playback control unit 52 reads out stored all scrap books from the recording and playback unit 18. The recording and playback control unit 52 supplies display data for displaying the table of scrap books to the display control unit 53 in accordance with the supplied information indicating the display pattern of the table on which scrap books to be selected by the user are displayed. The HDD recorder 1 displays the table of scrap books on the monitor 2 based on control by the control unit 20.

In step S123, the selection unit 51 supplies information to the recording and playback control unit 52, which indicates one of the scrap books from the table of scrap books to be selected by the user, based on a signal indicating the operation by the user for selecting one of the scrap books from the table of scrap books displayed on the monitor 2, which is supplied from the operation unit 19.

Figure 15:
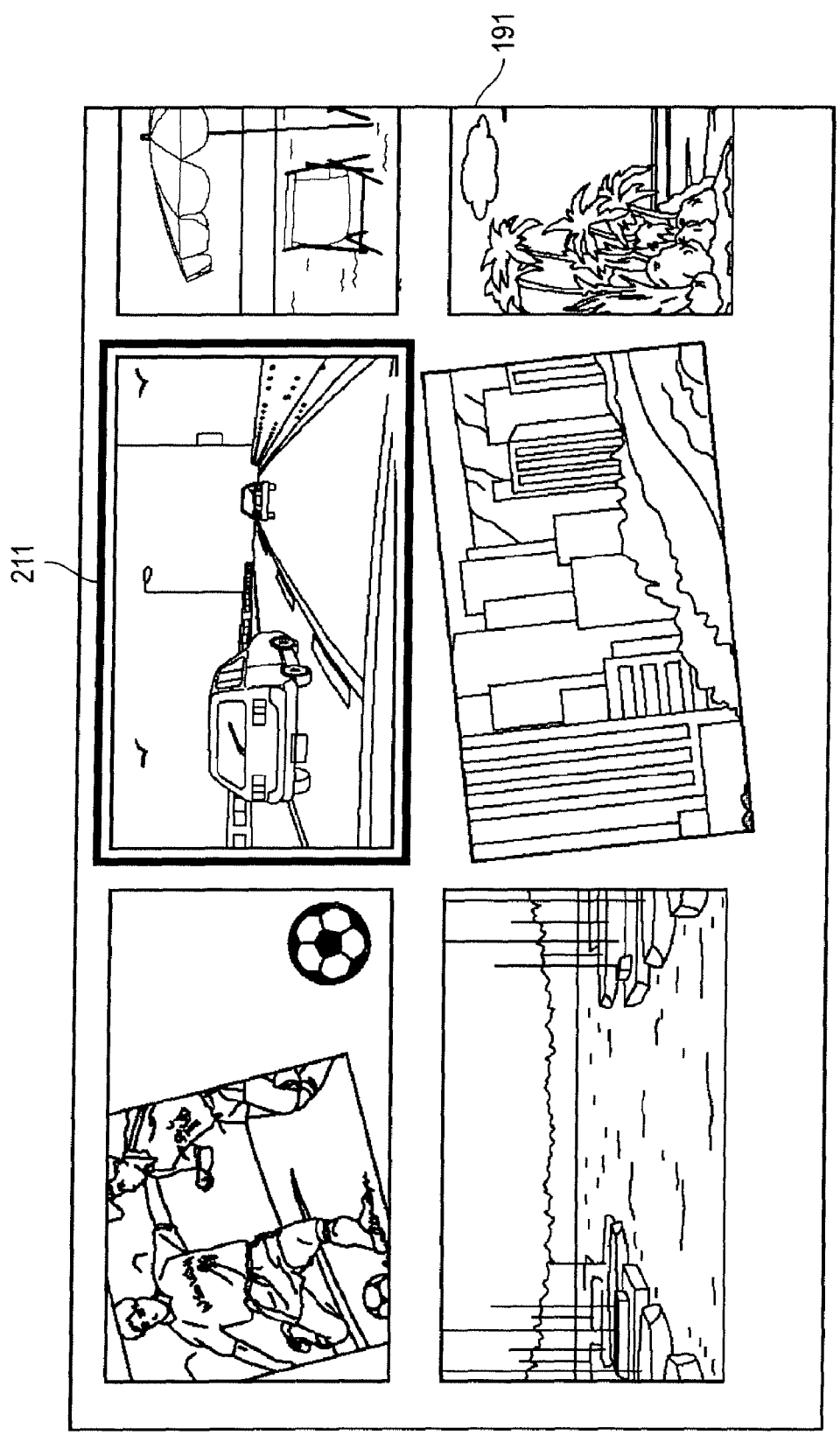
FIG. 15 is a view showing an example of display of a table of scrap books.
Figure 16:
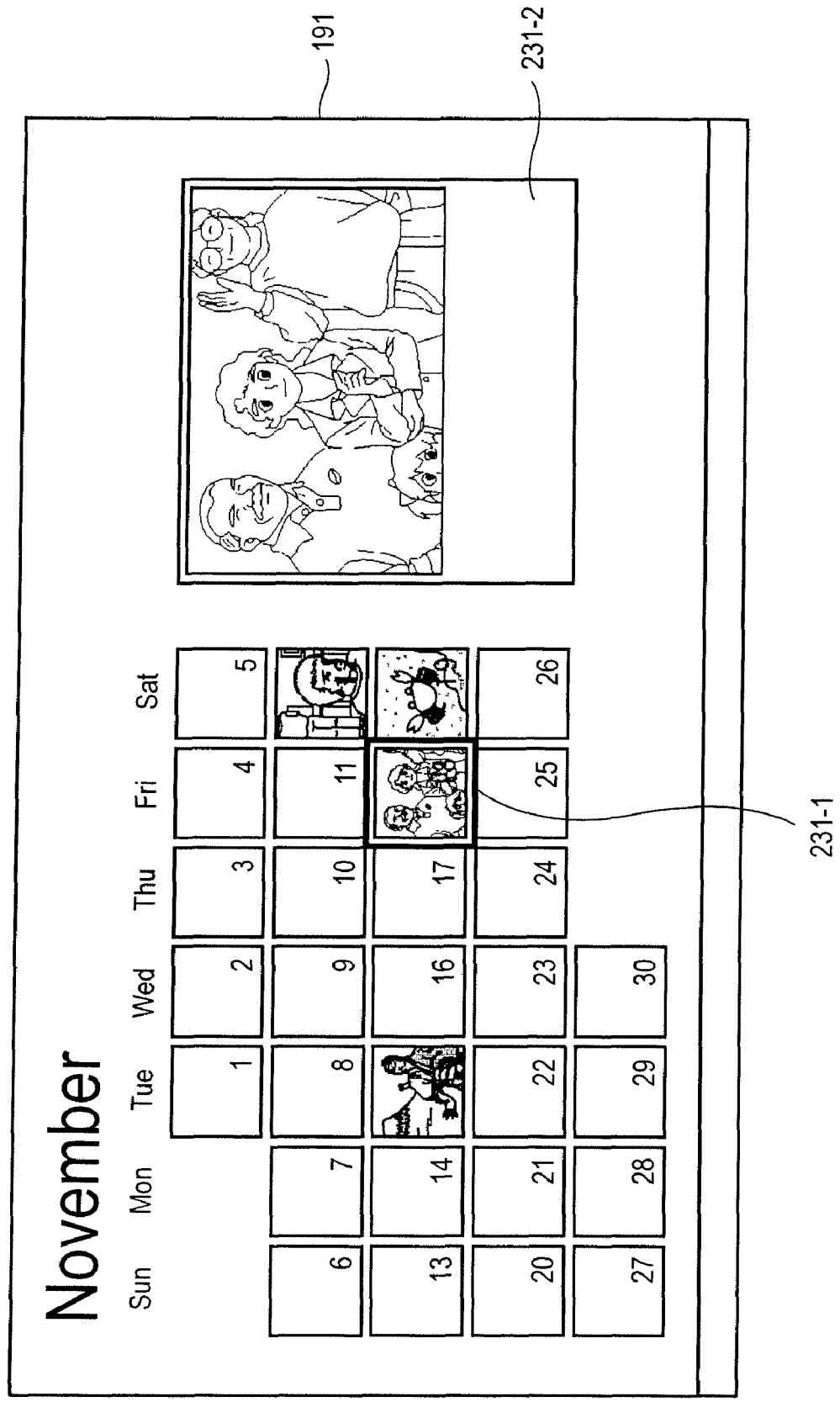
FIG. 16 is a view showing another example of display of a table of scrap books.

FIG. 15 to FIG. 17 are views showing examples of tables of scrap books displayed on the monitor 2.

FIG. 15 is a view showing an example of a table of scrap books displayed in an index form. In the example of FIG. 15, first pages to be front pages of respective scrap books are displayed as the table on a screen 191 of the monitor 2. The user can select one of the scrap books by operating the operation unit 19 and moving a cursor 211.

FIG. 16 is a view showing an example of a table of scrap books displayed using a calendar.

The screen 191 of the monitor 2 has a calendar display area displayed at the left and a preview screen display area displayed at the right. On the calendar display area, first pages to be front pages of respective scrap books are displayed on sections of corresponding dates in the calendar, based on metadata representing dates, which are added to the scrap books. On the preview screen display area, a preview screen 231-2 of the scrap book which exists on a date selected by a cursor 231-1 in the calendar display area is displayed.

In the example of FIG. 16, November 18 is selected by the cursor 231-1 in the calendar display area which shows November. The preview screen 231-2 of the scrap book to which metadata of the selected November 18 is added is displayed.

FIG. 17 is a view showing an example of a table of scrap books displayed using a map. A screen 191 on the monitor 2 includes a map display area displayed at the left and a table display area displayed at the right. On the map display area, a map showing a designated region is displayed. The user can select a designated place on the displayed map. On the table display area, a table of scrap books to which metadata of the place selected by the user is added is displayed.

In the example of FIG. 17, "Tokyo" in the map of the map display area is selected by a cursor 251-1. In the table display area, front pages of scrap books to which metadata of "Tokyo" is added are displayed. The user can select one of the scrap books from the displayed table.

Accordingly, one of the scrap books can be selected from the table of displayed scrap books.

Returning to FIG. 14, in step S124, the recording and playback control unit 52 supplies display data for displaying the selected scrap book to the display control unit 53 based on supplied information indicating one of the scrap books from the table of scrap books to be selected by the user. The HDD recorder 1 displays a front page of the selected scrap book on the monitor 2, based on control of the control unit 20.

In step S125, the recording and playback control unit 52 determines whether there is not a next page of the displayed scrap book. In step S125, when it is determined that there is not the next page, the process ends.

On the other hand, when it is determined that there is the next page, the process proceeds to step S126.

In step S126, the HDD recorder 1 displays the next page of the selected scrap book on the monitor 2 based on control of the control unit 20, and the process returns to step S125.

Accordingly, the HDD recorder 1 displays the scrap book.

In the above description, the process of adding metadata to image data is automatically performed by the control unit 20, however, it is also preferable that the process of adding metadata is performed by user's operation of the operation unit 19 to select an image of a certificate, a receipt, a ticket and a note.

In the above description, the scrap book is created from image data, however, the scrap book may be created from scrapbooks.

Accordingly, in the case that creation of contents is controlled, contents can be created. In the case that features of a designated image in plural images associated with each other are extracted, and that, based on the extracted features, the designated image is determined whether it is an image of the face of a certificate, a receipt, a ticket or a note on which a character string is written, and when it is determined that the designated image is the image of the face of a certificate, a receipt, a ticket or a note on which the character string is written, and in the case that the first metadata which is character string data of the character string is added to another image in plural images, contents can be grouped based on metadata generated by, for example, receipts, pamphlets or tickets.

The invention is not limited to the HDD recorder, but can be applied to apparatuses capable of recording or playing back images or contents, for example, can be applied to a personal computer and the like.

The series of processes described above can be executed by hardware as well as by software. When the series of processes is executed by software, the software is installed from program recording media to a computer in which programs included in the software are incorporated in dedicated hardware or, for example, a general-purpose computer which is capable of executing various functions by installing various programs.

The program recording media storing programs to be installed in the computer and allowed to be a state executed by the computer includes, as shown in FIG. 18, the removable media 311 which are package media such as the magnetic disc (including a flexible disc), the optical disc (including a CD-ROM (Compact Disc-Read Only Memory), a DVD (Digital Versatile Disc)), an electro-optical disc or a semiconductor memory, the ROM (not shown) in which programs are stored temporarily or permanently, and hard disc forming the storage unit 308 and the like.

Note that embodiments of the invention are not limited to the above embodiments and can be variously modified in the scope not departing from the gist of the invention.

It should be understood by those skilled in the art that various modifications, combinations, sub-combinations, and alterations may occur depending on design requirements and the other factors insofar as they are within the scope of the appended claims or the equivalents thereof.

What is claimed is:

1. An information processing apparatus, comprising:
feature extraction means for extracting, a character string appearing in a designated image in plural images which are associated with each other;
image determination means for determining whether the designated image is an image of a face of a certificate, a receipt, a ticket or a note on which the character string is written based on the extracted features; and
metadata addition means for adding a first metadata which is character string data of the character string to another image in the plural images, when it is determined that the designated image is an image of the face of a certificate, a receipt, a ticket or a note on which a character string is written.

2. The information processing apparatus according to claim 1,
wherein the feature extraction means extracts features of the designated image and recognizing a character string appearing in the designated image.

3. The information processing apparatus according to claim 1, further comprising:
metadata extraction means for extracting a second metadata added to the plural images associated with each other; and
grouping means for grouping the plural images into groups based on the extracted second metadata.

4. The information processing apparatus according to claim 1, further comprising:
metadata extraction means for extracting a second metadata added to the plural images associated with each other; and
creation means for creating a content in which the plural images divided into groups based on the extracted second metadata are arranged according to groups.

5. The information processing apparatus according to claim 3,
wherein the creation means sets background images to be backgrounds of the plural images and arrangements of the plural images in the content according to the first metadata or the second metadata when the content is displayed.

6. The information processing apparatus according to claim 3, further comprising:
number-of-common metadata determination means for determining whether a number of images to which a same metadata in the first metadata and the second metadata is added is not less than a prescribed threshold, and
wherein the creation means creates a content in which the plural images divided into groups based on the first metadata or the second metadata are arranged according to groups, when it is determined that the number of images to which the same metadata in the first metadata and the second metadata is added is not less than the prescribed threshold.

7. The information processing apparatus according to claim 3, further comprising:

synonym acquisition means for acquiring synonyms of the first metadata or the second metadata for every image to which the first metadata or the second metadata as words is added; and number-of-common metadata determination means for determining whether a number of images to which a same metadata in the first metadata and the second metadata is added is not less than a prescribed threshold, and wherein the creation means creates a content in which the plural images divided into groups based on the first metadata, the second metadata or the synonyms of respective images are arranged according to groups, when it is determined that the number of images to which the same metadata in the first metadata and the second metadata is added is not less than the prescribed threshold.

8. The information processing apparatus according to claim 3, further comprising:

display control means for controlling display of the contents.

9. An information processing method, comprising:

extracting a character string appearing in a designated image in plural images associated with each other;

determining whether the designated image is an image of a face of a certificate, a receipt, a ticket or a note on which the character string is written based on the extracted features; and adding the first metadata which is character string data of the character string to another image in the plural images, when it is determined that the designated image is an image of the face of a certificate, a receipt, a ticket or a note on which a character string is written.

10. A non-transitory computer program product including computer executable instructions, wherein the instructions, when executed by a computer, cause the computer to perform a method comprising:

extracting a character string appearing in a designated image in plural images associated with each other;

determining whether the designated image is an image of a face of a certificate, a receipt, a ticket or a note on which the character string is written based on the extracted features; and adding the first metadata which is character string data of the character string to another image in the plural images, when it is determined that the designated image is an image of the face of a certificate, a receipt, a ticket or a note on which a character string is written.

11. An information processing apparatus, comprising:

a feature extraction unit, including a processor, configured to extract a character string appearing in a designated image in plural images which are associated with each other;

an image determination unit, including a processor, configured to determine whether the designated image is an image of a face of a certificate, a receipt, a ticket or a note on which the character string is written based on the extracted features; and a metadata addition unit, including a processor, configured to add the first metadata which is character string data of the character string to another image in the plural images, when it is determined that the designated image is an image of the face of a certificate, a receipt, a ticket or a note on which a character string is written.

12. The information processing apparatus according to claim 11, wherein the feature extraction unit is configured to extract features of the designated image and recognize a character string appearing in the designated image.

13. The information processing apparatus according to claim 11, further comprising:

a metadata extraction unit configured to extract a second metadata added to the plural images associated with each other; and a grouping unit configured to group the plural images into groups based on the extracted second metadata.

14. The information processing apparatus according to claim 11, further comprising:

a metadata extraction unit configured to extract a second metadata added to the plural images associated with each other; and a content creation unit configured to create a content in which the plural images divided into groups based on the extracted second metadata are arranged according to groups.

15. The information processing apparatus according to claim 12, wherein the content creation unit is configured to set background images to be backgrounds of the plural images and arrangements of the plural images in the content according to the first metadata or the second metadata when the content is displayed.

16. The information processing apparatus according to claim 12, further comprising:

a number-of-common metadata determination unit configured to determine whether a number of images to which a same metadata in the first metadata and the second metadata is added is not less than a prescribed threshold, and wherein the content creation unit is configured to create a content in which the plural images divided into groups based on the first metadata or the second metadata are arranged according to groups, when it is determined that the number of images to which the same metadata in the first metadata and the second metadata is added is not less than the prescribed threshold.

17. The information processing apparatus according to claim 12, further comprising:

a synonym acquisition unit configured to acquire synonyms of the first metadata or the second metadata for every image to which the first metadata or the second metadata as words is added; and a number-of-common metadata determination unit configured to determine whether a number of images to which a same metadata in the first metadata and the second metadata is added is not less than a prescribed threshold, and wherein the content creation unit is configured to create a content in which the plural images divided into groups based on the first metadata, the second metadata or the synonyms of respective images are arranged according to groups, when it is determined that the number of images to which the same metadata in the first metadata and the second metadata is added is not less than the prescribed threshold.

18. The information processing apparatus according to claim 12, further comprising:

a display control unit configured to control display of the contents.

* * * * *